(12) United States Patent
Murrell et al.

(10) Patent No.: US 9,367,005 B2
(45) Date of Patent: Jun. 14, 2016

(54) IMAGING DEVICE AND METHOD FOR DETERMINING OPERATING PARAMETERS

(71) Applicant: Lexmark International, Inc., Lexington, KY (US)

(72) Inventors: Niko Jay Murrell, Lexington, KY (US); Julie Ann Gordon Whitney, Gerogetown, KY (US); Ryan Thomas Bradley, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/295,851

(22) Filed: Jun. 4, 2014

(65) Prior Publication Data

US 2016/0004193 A1    Jan. 7, 2016

(51) Int. Cl.
*G03G 15/20* (2006.01)
*G03G 15/00* (2006.01)

(52) U.S. Cl.
CPC .............. *G03G 15/205* (2013.01); *G03G 15/50* (2013.01)

(58) Field of Classification Search
CPC .. G03G 15/205; G03G 15/2039; G03G 15/50
See application file for complete search history.

(56) References Cited

U.S. PATENT DOCUMENTS

| | | | | |
|---|---|---|---|---|
| 8,010,000 B2* | 8/2011 | Goto | ..................... | G03G 15/161 399/177 |
| 8,095,226 B2* | 1/2012 | Mestha | .............. | G03G 15/0266 358/1.1 |
| 8,284,410 B2* | 10/2012 | Lee | ......................... | G03G 15/50 358/1.11 |
| 2004/0165897 A1* | 8/2004 | Hooper | .............. | G03G 15/2064 399/44 |
| 2005/0244181 A1* | 11/2005 | Bobo | .................. | G03G 15/2064 399/67 |
| 2009/0148176 A1* | 6/2009 | Shida | .................. | G03G 15/2039 399/45 |
| 2011/0222891 A1* | 9/2011 | Kagami | ............. | G03G 15/5029 399/69 |
| 2012/0082474 A1* | 4/2012 | Otsuka | ............... | G03G 15/2039 399/69 |
| 2013/0045021 A1* | 2/2013 | Yoshioka | ........... | G03G 15/2039 399/69 |
| 2014/0212160 A1* | 7/2014 | Fukaya | ................ | G03G 15/205 399/69 |
| 2015/0160594 A1* | 6/2015 | Shibuya | ............. | G03G 15/2039 399/69 |

* cited by examiner

*Primary Examiner* — W B Perkey
(74) *Attorney, Agent, or Firm* — John Victor Pezdek

(57) ABSTRACT

An operational imaging device and method using a predetermined set of operating parameter determining (OPD) equations forming an OPD equation set for providing one or more operational parameter values for processing of a media sheet. The OPD equation set, stored in the operational imaging device, is solved using values for a set of N variables measured by an operational sensor set in the operational imaging device. Each equation solution determines a value for one of the operating parameters. The OPD equation set is generated by a training system using a continuum training engine. A training data set containing measured variable values of the set of N variables is collected using by a training sensor set. The training data set includes empirically best match data values for the one or more operational parameters based on a comparison of a model image to images produced by a training imaging device.

39 Claims, 7 Drawing Sheets

IMAGING DEVICE AND METHOD FOR DETERMINING OPERATING PARAMETERS

CROSS REFERENCES TO RELATED APPLICATIONS

This patent application is related to the U.S. patent application Ser. No. 14/295,838, filed Jun. 4, 2014, entitled "Imaging Device And Method For Sensing Media Type" and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to imaging devices, and, more particularly, to those systems and methods for determining operating parameters for an imaging device.

2. Description of the Related Art

Incorrectly setting media type is a well-documented problem for users of imaging devices, such as electrophotographic printers. Setting media properties correctly is difficult for three primary reasons. First, properly identifying media is a subjective decision. Second, paper setting menus are sometimes difficult to locate and navigate. Third, classification of equivalent media is inconsistent. Additionally, media moisture content and environmental factors may invalidate correctly chosen settings. As a consequence of this, it is common for imaging devices to operate suboptimally.

There are consequences to improperly selected media type settings. The imaging device relies upon media type settings to control media handling, transfer, and fusing. Common failures related to improper media type settings include poor print quality, poor fusing, hot or cold offset, paper jams, media damage, component wear, and wrapping of the fuser by the media. This leads to user dissatisfaction.

To address this problem, several solutions that incorporate some form of printer control based upon sensed media properties have been developed. Prior art sensor implementations describe devices that measure a single media property, or at most, a few specific properties, such as optical density and impedance, to provide limited media identification. Prior art control schemes are limited in scope and are based upon an incomplete characterization of the media. Such prior art systems still rely upon user input and lack a holistic approach. An idealized, fully-featured sensing scheme would take a single, direct measurement of all relevant intrinsic media properties and use this information to model and control the imaging device. However, the number of intrinsic property measurements required to adequately control an imaging device, such as an electrophotographic printer, without user input is prohibitive as this approach is neither cost nor space efficient and requires a large number of sensors. Prior art sensing schemes have been incomplete because they have failed to measure some number of intrinsic properties of the media needed to more accurately determine the media type.

It would be advantageous to employ an approach to use sensor information about media and the imaging device environment to move directly to determining imaging device operating parameters instead of relying on a determined media type to select those operating parameters. The advantage of this type of approach not only arises from the fact that media is not inherently a given type, but also that there is variation within each type. A damp piece of media behaves fundamentally differently than a dry piece of the same media—whether that property is electrical, mechanical or has to do with heat capacity.

Media type classification schemes use different sets of sensors in order to be able to determine different media types. Typically, as the variety of media used increases, the number of sensors needed also increases. It would also be advantageous to provide a single sensor set where the information provided can all be combined to help predict operating parameters on a continuous scale. It would be still further advantageous if the operating parameter can be established without the need for user input.

SUMMARY

An operational imaging device and method is presented that uses a predetermined set of operating parameter determining (OPD) equations forming an OPD equation set for providing one or more operational parameter values for processing of a media sheet in the operational imaging device. The OPD equation set is solved using measured values for a set of N variables measured by an operational sensor set in the operational imaging device. The solution of each equation determines a value for one operating parameter in the one or more operating parameters. The OPD equation set is generated by a training system using a continuum training engine. A training data set containing measured variable values of the set of N variables is collected under various conditions using a training sensor set. After generation, the OPD equation set is stored in memory of the operational imaging device.

The set of N variables comprises temperature, relative humidity, electrical impedance magnitude, electrical impedance phase, gloss, bending stiffness, optical transmission mean, optical transmission deviation and media feed system base resistance. The operational sensor set includes sensors for measuring the set of N variables. The OPD equation set includes an OPD equation for determining a transfer voltage value, an OPD equation for determining a process state, an OPD equation for determining a fuser temperature value, and an OPD equation for determining fuser energy.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
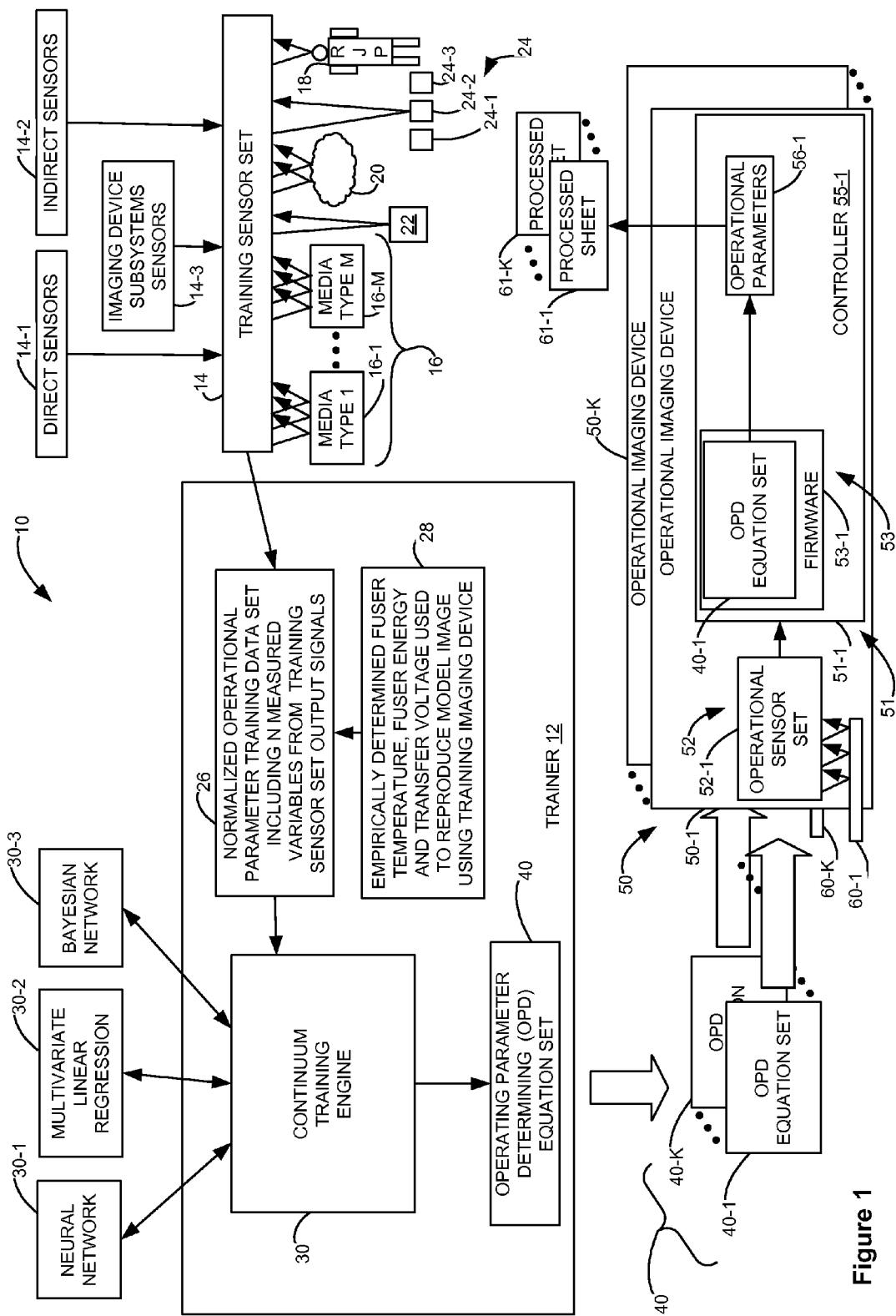
FIG. 1 is a schematic representation of a training system used with the presently disclosed system and methods.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back", "rear" and "side" "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the descriptions below.

These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the function specified in the block or blocks. Computer readable storage medium includes, for example, disks, CD-ROMS, Flash ROMS, non-volatile ROM and RAM. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions, such as the process models and the combined process models, as will be described in greater detail below, may be displayed in a user interface or computer display of the computer or other programmable apparatus that implements the functions or the computer program instructions.

The term "image" as used herein encompasses any printed or digital form of text, graphic, or combination thereof. The term "output" as used herein encompasses output from any printing device such as color and black-and-white copiers, color and black-and-white printers, and multifunction devices that incorporate multiple functions such as scanning, copying, and printing capabilities in one device. Such printing devices may utilize ink jet, dot matrix, dye sublimation, laser, and any other suitable print formats. The term button as used herein means any component, whether a physical component or graphic user interface icon, that is engaged to initiate an action or event.

Referring now to FIG. 1, a schematic representation of a training system 10 used with present continuum sensing system is illustrated. Included in training system 10 is a trainer 12 that provides firmware that will be incorporated into one or more operational imaging devices, generally indicated 50, operational imaging devices 50-1 through 50-K as shown. Also included in training system 10 is a training sensor set 14, a training media set 16 comprised of M different media types, 16-1-16-M, a robot 18, a training imaging device 22, and imaging device subsystems 24. A robot 18 or robotic job processor 18 is simply a machine designed to perform a function of an operational imaging device 50. For example, where the operational imaging device 50 is an electrophotographic printer, training system 10 may use a fuser robot that performs fusing, a transfer station robot that performs toned image transfer to a media sheet, or a media feed robot that emulates feeding media sheets. Training sensor set 14 is used to measure N different variables related to each media type in the training media set 16 or to measure imaging device dependent parameters related to the training imaging device 22 or its subsystems 24 to form a single training data set 26. A training imaging device 22 would be an imaging device that is substantially the same as an operational imaging device 50 that would be used by a customer. However, the training imaging device 22 would be used in a laboratory or test enclosure so that environmental conditions could be controlled when making measurements as described herein.

A training sensor set 14, consisting of a predetermined collection of sensors, provides data measurement points to trainer 12. The types and number of sensors used will be described below and will vary dependent upon the media types included in training media set 16, the ambient conditions 20 to be measured, the type of robots 18 and training imaging device 22 used, and functional requirements and customer requirements for the operational imaging devices 50. The training sensor set 14 is used in conjunction with the training media set 16, comprised of samples of M different media types and provides multiple data points for each variable in a predetermined set of N variables. Possibly included in the set of N variables that training sensor set 14 measures, as illustrated by the reflecting arrows, are those relevant to each media type M in the media set 16; ambient conditions, indicated by cloud 20, such as temperature and relative humidity where the training media set 16 is located, and variables relevant to the operational imaging device 50 such as electrical, thermal and mechanical properties measured using the robots 18 or training imaging device 22. An operational imaging device designer chooses variables that will provide a resolution sufficient to determine each media type M within the training media set 16. The chosen variables N relevant to determining the desired operating parameters are empirically determined and verified. For a given family of operational imaging devices 50, the chosen N variables are measured using subsystems that are equivalent to subsystems common to each member of the given family of operational imaging devices 50. These subsystems may be provided in a training imaging device 22 or may be individually provided subsystems, generally indicated 24, such a transfer station 24-1, fuser 24-2 or media feed system 24-3, etc. It will be noted that each media type M is tested with each robot 18, the training imaging device 22, if present, or subsystems 24 at several different ambient conditions and measurements are also taken at a plurality of locations within the borders of the media sheet. The use of robots 18 and/or subsystems 24 may obviate the need to use a training imaging device 22.

Training sensor set 14 comprises direct sensors 14-1, indirect sensors 14-2 and subsystem response sensors 14-3 for one or more subsystems that will be present within the operational imaging device 50. Such subsystems include a fuser, a toner transfer station, a media feed system, and a finisher, which may also be termed a processing device.

Direct sensor measurements are of a characteristic of the media. These direct measurements include, but are not limited to, optical, electrical impedance, reflectance, thermal capacitance, etc. A more extensive list of direct sensor measurements that may be used with the present system 10 and operational imaging devices 50-1-50-K is provided in Table 1 below.

Indirect measurements include, but are not limited to, temperature, relative humidity, and/or the desired machine state, e.g., process speed. When such indirect measurements are made, each media type in the media set and each imaging device subsystem are measured at the desired indirect measurement points. For example, when temperature and relative humidity are being measured, each media type in the training media set 16 and each imaging device subsystem 24 are measured at several different temperature and humidity points, such as, for example, 22° C. at 50% relative humidity, 25.6° C. at 80% relative humidity, and 15° C. at 8% relative humidity. These temperature and humidity points are environments in which operational imaging devices 50 may be placed. Multiple samples of each media type are measured in these different environments to generate the training data set 26. Other temperature and humidity conditions may also be measured.

Subsystem response measurements include change of fuser temperature occurring for each media type in the training media set 16 as they are fed through the fuser, change in transfer nip voltage or current occurring for each media type as they are fed through the transfer nip of the transfer station, media feed motor current for each media type as they are fed through the media path, and/or media location within the media path. Again these measurements may be taken at several different temperatures and relative humidity values and are included in the training data set 26.

A single sensor in the training sensor set 14 may provide data for two or more variables in the set of N variables. For example, an impedance sensor may provide both magnitude and phase data points. The output of each sensor in the training sensor set 14 may be conditioned and normalized by trainer 12 so that M data training sets 26 contain normalized data points. This helps to improve performance of training system 10.

The data for the N variables is collected in a single data set 26, unlike a classification system which uses a data set for each media type expected to be used. It will be appreciated that the number of data points within each data set 26 will number in the thousands. The measurements taken for the training data sets 26 may also account for sensor aging, sensor variability, media variability, imaging device subsystem variability to achieve a robust set of OPD equations flexible enough to handle variability in the operational sensor set 52, in the media types and the operational imaging devices 50. Further, multiple instances of the same sensor and multiple instances of the same type of media sheet may be used when populating the training data set 26.

Additional empirical data 28 is also contained in training data set 26. An empirically chosen model or ideal image is reproduced by the training imaging system 22 at several different transfer voltages, fuser temperature and fuser energy levels at several process states on a given media type or given set of media types. The printed images are then compared to the model image—either by an evaluator or by a robotic process—to empirically determine the best match to the model image for the given media type or set of given media types. The fuser temperatures, fuser energy, and transfer voltages used to reproduce these "best" matches are the empirical data 28 included in the operational parameter of training data set 26. This best match data 28 is used only by the continuum training engine to produce the OPD equation set 40.

Figure 2:
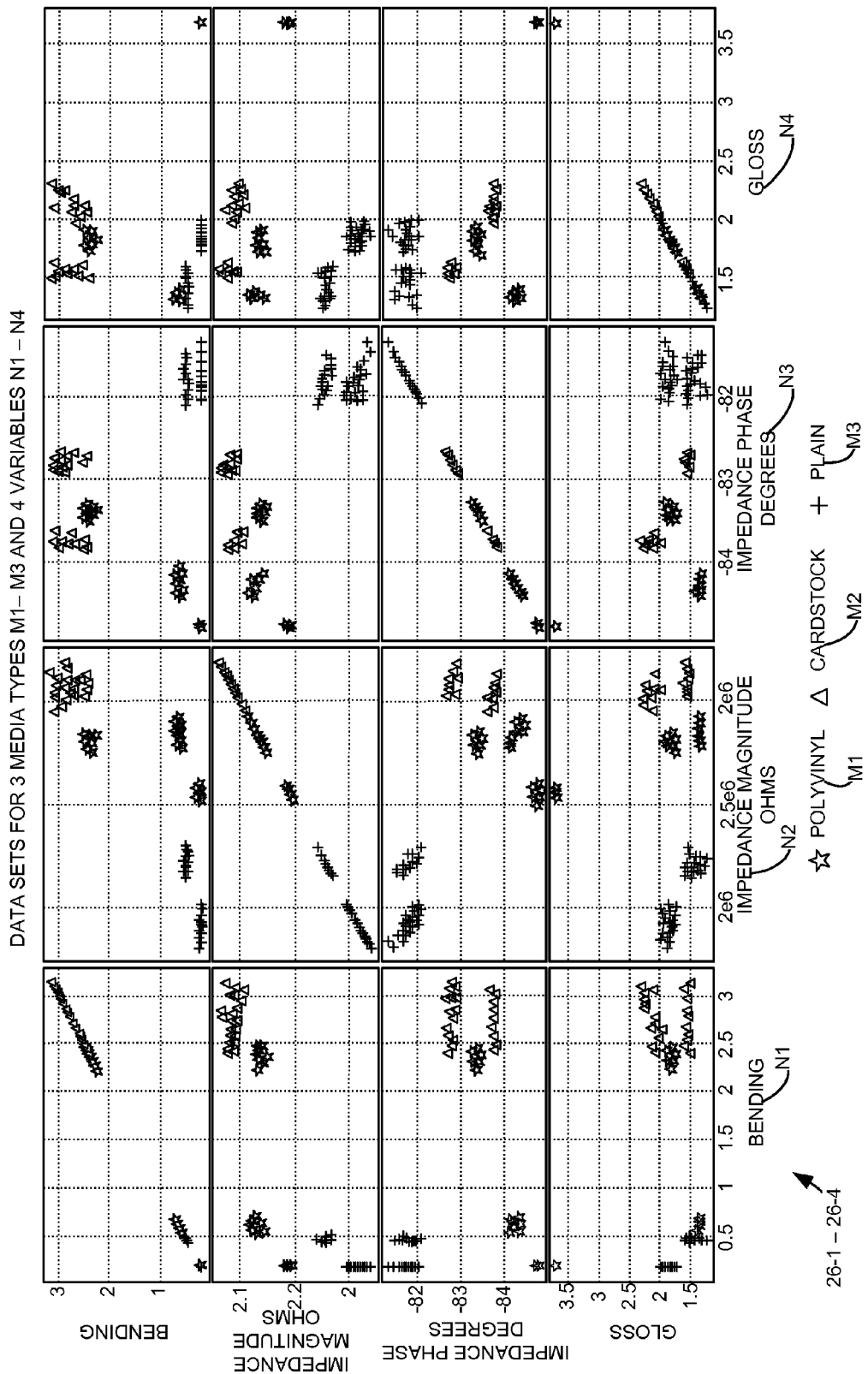
FIG. 2 is an illustration of training data sets.

As used herein, the N variables in each data set 26 for each media type M includes the variables types previously described such as temperature, relative humidity and corresponding imaging device variables, all as selected for inclusion in the predetermined set of N variables. FIG. 2 illustrates a 4×4 matrix of three data sets 26-1-26-3 for three media types—polyvinyl M1, cardstock M2 and plain paper M3 which are integrated to form data set 26. Note that the data in FIG. 2 has not been normalized. The data points for polyvinyl M1 are indicated by a star, those for cardstock M2 by a triangle, and those for plain media M3 by a cross. For the data sets 26-1-26-3, the four variables chosen by the imaging device designer to be measured are bending N1 in Watts, impedance magnitude N2 in ohms, impedance phase N3 in degrees and reflectance or gloss N4 in Volts. Clustering of the data points for each of the media types M1-M3 can readily be seen. These three data sets 26-1-26-3 would be integrated into data set 26 which would then be processed by trainer 12 to produce OPD equation set 40.

For the purposes of developing an OPD equation that can successfully find a desired operating parameter value, the measured sensor values are normalized prior to training. This is because units of Ohms have no physical comparison to units of optical density, degrees of temperature, or percent relative humidity, etc. The goal is to compare how the media is changing with respect to its physical properties and by normalizing the inputs to the same order of magnitude this can be more easily achieved. Before training, these input values are normalized such that the magnitudes of each of the inputs are roughly equivalent over the range expected by the operational imaging devices 50, the media types expected to be used, expected environments of use, and one or more desired machine states, for example, 40 page per minute (ppm) process speed or 70 ppm process speed. The measured values provided by the operational sensor sets 52 would also be normalized prior to controllers 51 solving the OPD equation sets 40. It should be understood that the number of variables N does not have to equal the number of media types M.

The data set 26 of N variables and empirical data 28 is fed into a continuum training engine 30. Using data set 26, continuum training engine 30 produces as an output an OPD equation set 40 containing one or more OPD equations. The number of OPD equations in OPD equation set 40 is a matter of design choice. There is one OPD equation for each imaging device operating parameter to be controlled. The operating parameters are chosen by the imaging device designer and may be any continuous operating parameter. Non-limiting examples of continuous operating parameters include fuser temperature, fuser pressure, transfer voltage, and combinations of the foregoing with a process speed. The process speed in pages per minute (ppm) is usually a series of discrete settings such as 40 ppm or 70 ppm. The present method allows the chosen operating parameters to be selected from a continuum of values rather than from within a discrete range providing increased operational resolution. For example, if fuser temperature, transfer voltage and a combination of process speed and fuser temperature were the three chosen operating parameters, the OPD equation set 40 would contain three OPD equations. The OPD equation set 40 will be replicated, 40-1 through 40-K as shown, and installed into each corresponding operational imaging device 50-1-50-K.

Continuum training engine 30 uses a supervised machine learning algorithm used to map inputs (sensed media variables or properties like bending stiffness, electrical impedance, acoustic transmittance, optical reflectance, etc.) to determine a value for one or more OPD equations in OPD equation set 40. In supervised learning, for a given input data set, the correct output is known. For data in the training data set 26 the operating parameter (e.g. voltage, fuser temperature, etc.) to which the data belongs is known. Unlike a media type determining system, with a continuum training engine 30, results are predicted along a continuum of values and input variables are mapped to the continuum—here the continuum of values for an operating parameter. Once the OPD equations are formed, these equations, when placed in the operational imaging devices 50, take measured variable values from the operational sensor set 52 as inputs and use them to solve for the corresponding value(s) of the operational parameter(s). The measured variable values are also termed instances.

Continuum training engine 30 may be one of well known continuum engines as known in the art that analyze data and recognize patterns for classification. These include a neural network 30-1, a multivariate linear regression engine 30-2, and a Bayesian network 30-3. Continuum training engine 30 operates on the data set 26 to produce the multi-variable OPD equation set 40. The OPD equation set 40 may be constructed many different ways. In one embodiment (created using regression techniques), it resembles a higher order multivariable polynomial. In another embodiment (created using neural networks), it resembles two theta matrices. The form of the OPD equation will be determined by the type of continuum training engine used in trainer 12. Note that, once determined, the OPD equation may be manipulated to take any convenient mathematical form.

As part of the training process, a test data set may be used to validate OPD equation set 40. This is done by separating the entire training data set 26 into two subsets. A training data set comprising about ⅔ of the entire data set 26 is randomly selected and is used to develop the OPD equations. A test data set comprising the remaining ⅓ of the entire data set 26 is used to empirically evaluate the OPD equations generated from the ⅔ training data set. This validation technique is well known to one of skill in the art. Using training system 10 to develop the coefficient matrix for each of the OPD equations in the OPD equation set 40 to control the imaging device 50 easily allows for the inclusion of additional sensors. Training system 10 therefore allows for expansion and/or changes of the selected variables N that may be needed with other imaging products to work optimally. Training system 10 is easily expandable and adaptable to future imaging devices and future media types.

OPD equation set 40 is replicated, indicated as 40-1-40-K, in firmware, generally indicated 53, to be used in each of the operational imaging devices 50. As shown, OPD equation sets 40-1-40-K are provided in firmware 53-1-53-K of operational imaging devices 50-1 through 50-K, respectively. Operational imaging devices 50 are those that would be provided to users for a specific application, such as a retail application, an office application, or a general purpose application, etc. Operational imaging devices 50-1-50-K would be distributed to different locations for use by various end users. Operational imaging devices 50-1-50-K would have the same processing devices, e.g., the same fuser types, transfer stations, media feed systems and firmware. Should the processing device hardware or the customer requirements change, then the OPD equation set 40 would have to be redetermined for the new hardware configuration. Operational imaging devices 50-1-50-K include controllers 51-1-51-K and an operational sensor set 52-1-52-K. Media sheets 60-1-60-K are readied to be processed by their corresponding operational imaging devices 50-1-50-K. Operational sensor sets 52-1-52-K measure the values of the same N variables that were used in the set of N variables that were measured by the training sensor set 14 and provide those measured data values to controllers 51-1-51-K. The individual sensors in each of operational sensor sets 52-1-52-K may be the same as or similar to those used in training sensor set 14. Controllers 51-1-51-K utilize the measured N variable values provided by the operational sensor sets 52-1-52-K to solve the OPD equation sets 40-1-40-K stored in firmware 53-1-53-K to determine the value for each operational parameter for which there is a corresponding OPD equation in OPD equation set 40. For example, in operational imaging device 50-1, operational sensor set 52-1 provides measured values for the set of N variables as a sheet of media 60-1 is readied for processing. Controller 51-1 uses the measured N variable values to solve the OPD equation set 40-1, to produce the corresponding values of the operational parameters. For example, for sensor set 52-1 assume there are three operational parameters to be determined, the measured values provided by sensor set 52-1 would be used to solve the equations in the OPD equation set 40-1 in parallel to produce the values for the three operating parameters. The one or more operational parameters 56-1 are used by operational imaging device 50-1 or a subsystem to process the readied media sheet 60-1 to produce a processed media sheet 61-1. A similar process would be occurring in each of operational imaging devices 50-2-50-K to create processed sheets 61-2-61-K. The measurements of the N variables may be taken for each media sheet as it is being fed or at the start of an imaging job.

During training, the extrinsic properties to be measured are selected to closely relate to operational imaging device 50 functions. This increases success in determining the values of the operating parameter and reduces the number of required sensors. Where the operational imaging device 50 is an electrophotographic printer, media interacts with three major printer subsystems: media handling, toner transfer, and fusing. It follows that sensed variables or characteristics may be closely related to the fundamental operation of these subsystems. The present operating determining method may also use as a variable one or more of the following variables or characteristics: lumped electrical time response (toner transfer), lumped thermal time response (fusing), mechanical composition (media handling), and other characteristics (e.g., size, temperature, relative humidity).

At a transfer station, an electric field is generated to move charged toner particles from a donor substrate to the media. Electrical characteristics of the media dictate how quickly the electric field will build and what the field strength will be for an applied voltage. Functionally, it is important to know the time response of media to a given voltage input. Appropriate intrinsic measurements for lumped electrical time response may include one or more of a volumetric measure of impedance (magnitude and phase angle), electrical time constant (resistance and capacitance), or some other similar metric.

In the fuser, temperature and pressure are applied to transfer heat to the media, melt toner, and affix it to the media. The lumped thermal characteristics of the media dictate how quickly heat will transfer into the sheet and how much heat must be transferred to adequately melt toner. Appropriate intrinsic measurements may include a bulk measurement of thermal mass (mass and specific heat), thermal time constant (heat transfer coefficient, specific heat, density, and thickness), thermal diffusivity (density, specific heat, and thermal conductivity), or some other similar metric.

Within the operational imaging device 50, media is conveyed through the system via driven rollers. Mechanical characteristics of the media dictate how much drag the media generates in the media path and how much torque the system must provide to transport the media. Appropriate intrinsic measurements might include bending stiffness (elastic modulus and area moment of inertia), coefficient of friction, or some other similar metric.

Media acclimation (temperature and relative humidity) and the desired machine state (process speed) may also affect each of these three media characteristics. For example at high ambient temperature and relative humidity one media type containing more moisture than at standard temperature and relative humidity conditions, may be better processed using settings for another media type.

An understanding of these three media characteristics (lumped electrical time response, lumped thermal time response, and mechanical composition) is necessary to sufficiently control print processes. If sensors are chosen to closely map to functionally-relevant extrinsic properties that relate to printer function, adding additional sensors to measure additional characteristics only slightly increases performance of the system. Other measurements that loosely correlate to these intrinsic properties may also be of value. An example would be the imaging device subsystem responses.

Media properties may be sensed using a wide variety of possible measurement techniques. Using the fundamental media characteristics just discussed as a guidepost helps limit the set of possibilities. Additionally, the measurement technique or sensing methods would be safe, unobtrusive, compact, energy efficient, inexpensive, and sample rapidly. Measurements should avoid containing redundant information. The sensing methods should be sufficiently independent or be decoupled from one another. This general design guideline provides the continuum training engine 30 with better performance and reduces the number of required sensors and/or measured variables N.

The following describes a variety of sensor types that may be used to make the measurements for the selected variables in the set of N variables. Sensors include those that measure electrical impedance, bending stiffness, optical reflectance, optical transmission, and acoustic transmission. The following extrinsic measurement techniques were selected because they enable the system 10 and operational imaging devices 50 to take measurements that closely correlate to the fundamental media properties listed above.

Impedance phase angle and magnitude are derived from media response to an AC voltage applied across the thickness of the sheet while it is staged in a pair of metal rollers. From this, media resistance or capacitance may be calculated. In one embodiment, a 10 KHz wave of 1 volt was sufficient excitation for characterization. This sensor provides an output that closely correlates to lumped electrical time response (electrical impedance or resistance and capacitance).

Media bending stiffness is measured as a function of a sheet resistance to deformation. The motor current (torque) required to drive a bar that bends a staged sheet is measured. This torque directly correlates to the media modulus of elasticity and area moment of inertia. This sensor provides an output that closely correlates to mechanical composition (bending stiffness). An example of a media stiffness sensor may be found in copending U.S. patent application Ser. No. 14/145,601, entitled "Media Stiffness Sensor Assembly For An Imaging Device," and Ser. No. 14/145,661, entitled "Method Of Using An Imaging Device Having A Media Stiffness Sensor Assembly" both filed Dec. 31, 2013. Alternatively, media feed motor current used to pick or move the media sheet can also be used as an indicator of media stiffness where higher current is needed to pick or move stiffer media.

A pair of photodiodes is used to measure the ratio of specular and diffuse light emitted by an LED and reflected off the surface of a media sheet. The ratio serves as a relative measure of roughness. This sensor provides an output that closely correlates to mechanical composition (coefficient of friction) and loosely correlates to lumped electrical time response and lumped thermal time response (contact resistance).

An optical transmission sensor measures an amount of light transmitted through a media sheet. The optical transmittance sensor is an infrared LED and a photodetector pair. The infrared LED emits light on one side of the sheet. The photodetector is positioned on the other side of the sheet and measures the quantity of light that is transmitted through the sheet. Several measurements are taken as the sheet is moved by the sensor and an optical average and optical standard deviation are calculated. The transmitted energy is a function of the opacity of the media sheet which correlates to thickness or mass of the media sheet. This sensor provides an output that closely correlates to lumped thermal time response (thermal mass).

A purpose of the present media sensing system is to use a defined number of independent extrinsic measurements to develop the OPD equation set 40 capable of training an operational imaging device 50 that meets the user application. Applications which use limited sets of known media types or that can accept misclassifications of media types without a significant negative impact can be successfully controlled with fewer sensors. Alternatively, additional measurements and/or sensors may be added to improve accuracy and robustness. Table 2 provides example operational sensor sets that would meet several different levels of performance requirements.

In one form, the chosen sensor values to be used for generating and solving the OPD equation set comprise those listed in Table 1. The upper variable set listed will provide three OPD equations in OPD equation set 40 providing an operating value for fuser temperature, fuser pressure and transfer voltage. The lower variable set is expanded to include the variables "Media Feed System Resistance without Media" and "Media Stiffness or Feed Motor Current" and provides, in addition to the other three equations, a fourth OPD equation in the OPD equation set for process state that is related to the media feed speed, such as 40 pages per minute.

TABLE 1

Operational Variable Sets

| Operating Parameters | Variable Set |
| --- | --- |
| Fuser Temperature | Temperature |
| Fuser Pressure | Relative Humidity |
| Transfer Voltage | Optical Transmission Mean |
| | Optical Transmission Deviation |
| | Reflectance |
| | Impedance Magnitude |
| | Impedance Phase |
| Fuser Temperature | Temperature |
| Fuser Pressure | Relative Humidity |
| Transfer Voltage | Optical Transmission Mean |
| Combinations of | Optical Transmission Deviation |
| the foregoing | Reflectance |
| Operational | Impedance Magnitude |
| Parameters with a | Impedance Phase |
| Process State | Media Stiff or Media Feed Motor Current |
| | Media Feed System Resistance without Media |

Figure 3:
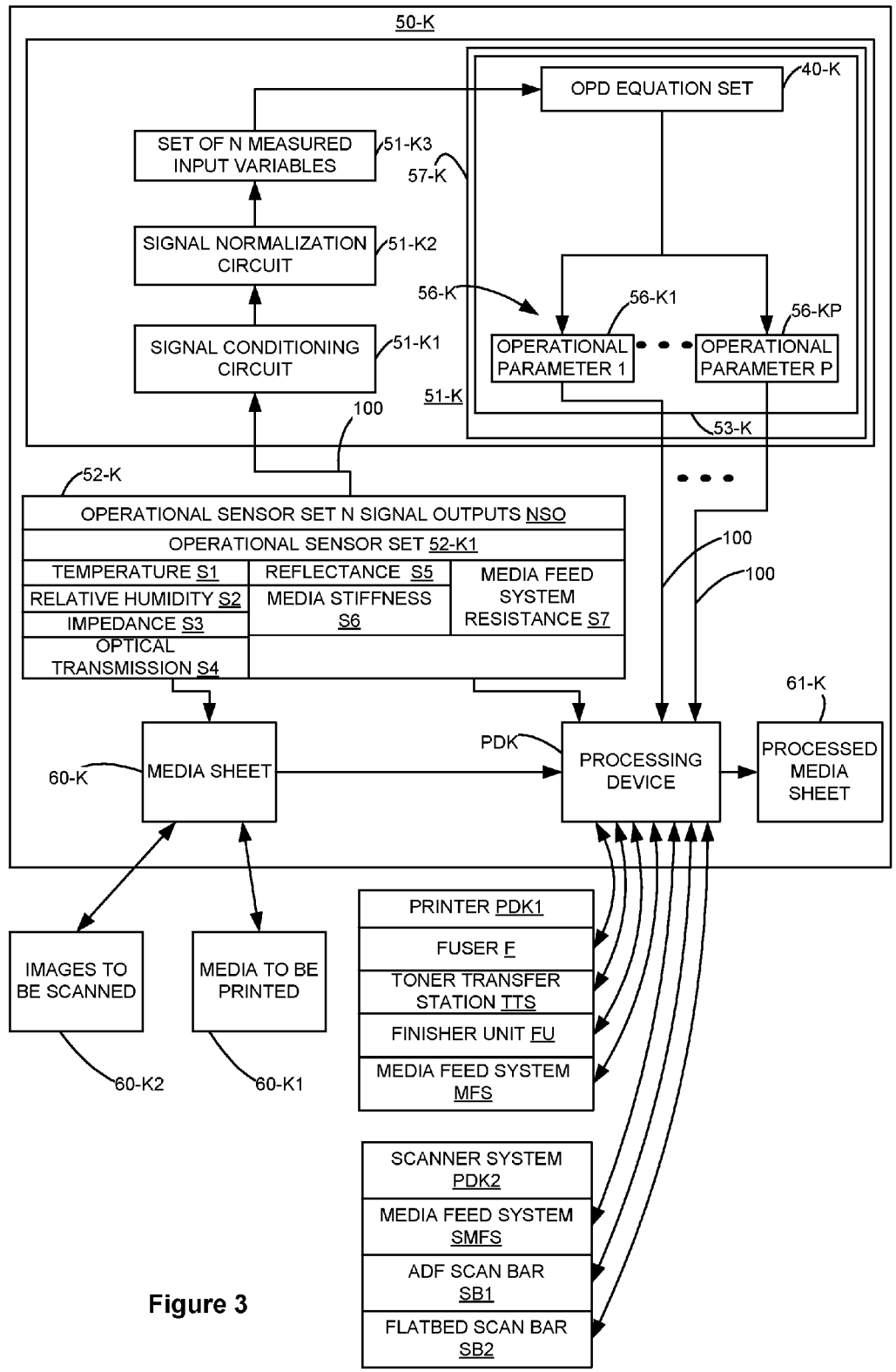
FIG. 3 is a schematic representation of an operational device employing the presently disclosed system and methods.

Referring now to FIG. 3, there is shown a diagrammatic depiction of an example operational imaging device 50-K. Controller 51-K is operatively coupled to operational sensor set 52-K having a plurality of output signals provided to controller 51-K via communication link 100. In one form, operational sensor set 52-K consists of a sensor set 52-K1 consisting of temperature, relative humidity, impedance, optical transmission, and reflectance, density sensors S1-S5, respectively, and additional sensor set elements consisting of media stiffness and media feed system resistance sensors S6-S7, respectively. The composition of the base sensor set 52-K1 is a matter of design choice and the intended application of operational imaging device 50-K. For example, another base sensor set may be comprised of sensors S1-S5 plus sensor S7. The types of sensors in the base sensor set 52K-1 and the additional sensor set elements are meant only to be illustrative, and are not intended to be limited to only those sensors shown. Because one sensor may provide data values for two or more of the variables in the set of N variables, the number of sensors SX may be less than the number of variables N that are measured. Note that by adding sensor S7 to base sensor set 52-K1, four operating variables, fuser temperature, fuser pressure, transfer voltage and process state, may be provided by controller 51-K. Again, the nature and number of operating parameter values provided is a matter of design choice and may be fewer than those listed.

The N signal outputs, designated NSO, from operational sensor set 52-K are provided to controller 51-K via communications link 100. The NSO are measured values of each variable in the set of N variables. As shown, NSO are provided to signal conditioning circuit 51-K1 and signal normalization circuit 51-K2 for conditioning and range normalization to produce an input set of N measured variable values 51-K3. Note that signal conditioning and normalization steps may also be performed by firmware. At firmware 53-K, the set of N measured inputs variables are processed by controller 51-K to solve OPD equation set 40-K to produce one or more operational parameters 56-K, as shown, operational parameters 56-K1-56-KP. The number and type of operational parameters 56-K1-56-KP selected are a matter of design choice and the set of N measured input variable values 51-K3. Using communication link 100, the operational parameters 56-K1-56-KP are provided to processing device PDK.

The media sheet 60-K which is to be processed is provided to processing device PDK which produces processed media sheet 61-K. Media sheet 60-K may be media to be printed 60-K1 or images to be scanned 60-K2. Processing device PDK may, in one form, be a printer or print engine PDK1 or, in another form, a scanner system PDK2. Printer PDK1 may be an electrophotographic printer or an ink jet printer or other printer types as known in the art. Printer PDK1 is illustrated as an electrophotographic printer having a fuser F, a toner transfer station TTS, a finisher unit FU providing hole punching and stapling, and media feed system MFS. Scanner system PDK2 is illustrated as having a media feed system SMFS, an automatic document feeder ADF, a scan bar SB1, and a flatbed scan bar SB2. Where automatic document feeding or duplex scanning are not needed, the ADF and scan bar SB1 are not used. When processing device PDK is printer PDK1, operational parameters 56-K may be provided, for example, to fuser F, toner transfer station TTS, finisher unit FU, and media feed system MFS of printer device PDK1. When processing device PDK is scanner PDK2, operational parameters 56-K may be provided, for example, to media feed system SMFS, ADF scan bar SB1 and flatbed scan bar SB2.

As used herein, the term "communications link" is used to generally refer to structure that facilitates electronic communication between multiple components, and may operate using wired or wireless technology. Controller 51-K includes a processor unit and associated memory 57-K, and may be formed as one or more Application Specific Integrated Circuits (ASIC). Memory 57-K may be, for example, random access memory (RAM), read only memory (ROM), and/or non-volatile RAM (NVRAM). Alternatively, memory 57-K may be in the form of a separate electronic memory (e.g., RAM, ROM, and/or NVRAM), a hard drive, a CD or DVD drive, or any memory device convenient for use with controller 51-K. Firmware 53-K may reside in memory 57-K. Controller 51-K may be, for example, a combined printer and scanner controller.

Figure 4:
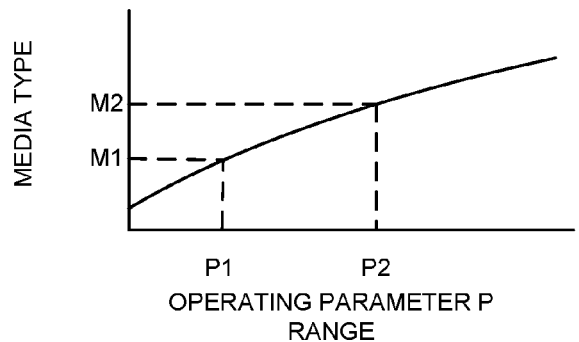
FIG. 4 illustrates selection of an operating parameter value based on a determined media type.
Figure 5:
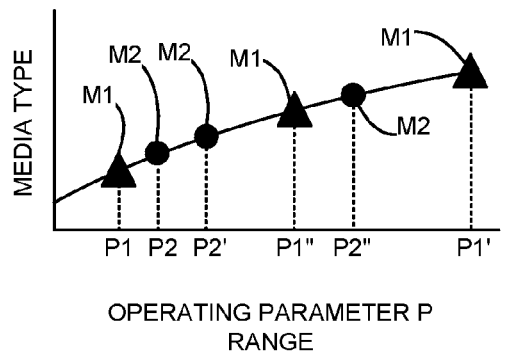
FIG. 5 illustrates selection of an operating parameter using continuum operating parameter determination.

FIGS. 4-5 illustrate two arrangements for the various operational parameters 56-K1 through 56-KP that are chosen. In both figures, the abscissa is the range of an operational parameter and the ordinate is a media type. In both figures, two media types M1, M2 are shown in rectangles, the width of which indicates the range of a given operational parameter P. In FIG. 4, the media type determines the respective value of operational parameter as would be found with a media type sensing or classification system. As shown for media type M1 the corresponding discrete operational parameter value is P1, similarly for media type M2 the operational parameter value is P2. In FIG. 5, the range of operational parameter P1 for media type M1 can vary based on the received values for the set of N measured input variable 51-K3. As shown, the solution for the OPD equation associated with operational parameter P1 can vary as shown at values P1, P1' and P1" for media M1 indicated by the triangles, and similarly for media M2, indicated by the circles, at values P2, P2' and P2". This variation in the values of the operating parameters P1 and P2 may, for example, be due to a change in ambient conditions or due to variation of a media characteristic. Thus, rather than the media type determining the operating parameter, the operating parameter is determined for the media being processed at that time independent of the actual media type.

Figure 6:
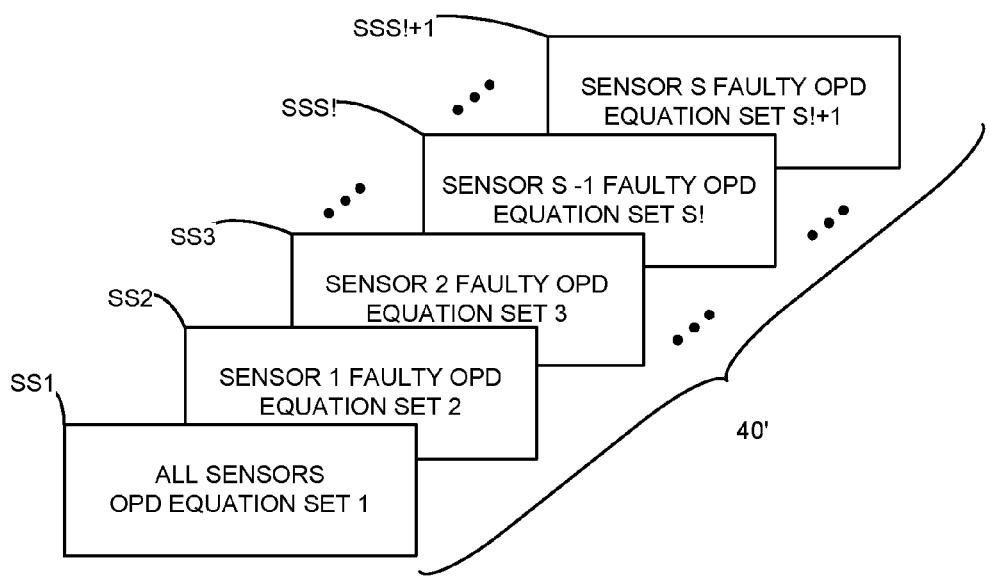
FIG. 6 illustrates the use of a matrix of operating parameter determining equation sets to handle faulty sensors.

FIG. 6 illustrates a further structure that may be used for the OPD equation set 40. Occasionally, a sensor within the operational sensor set 52 may fail. The sensor may stop working entirely or the output signal of the sensor may drift outside of an expected range. In either case this may be addressed by providing additional sets of media determining type equation sets. Assuming that all combinations of malfunctioning sensors are detectable, OPD equation set 40 would be replaced with OPD equation set matrix 40' comprised of a total of S!+1 OPD equation sets where S is the total number of sensors in operational sensor set 52. The first set operational sensor set SS1 would be one in which all S sensors are functioning. The second operational sensor set SS2 would be one in which sensor S1 is faulty, the third set SS3 is one where sensor S2 is faulty, and so on where sensor set SSS! is the penultimate faulty sensor set and sensor set SSS!+1 is the final faulty sensor set. In creating the OPD equation sets for the various combinations of faulty sensors (or conversely for the various combinations of remaining functional sensors), training system 10 would use only that data within each of the training data set 26 that corresponds to the remaining functioning sensors within operational sensor set 52. For example, suppose sensor 1 and sensor 3 were faulty in operational imaging device 50-K, the OPD equation set within matrix 40' of OPD equation sets selected for use would be that where the data supplied by sensors 1 and 3 would not be used in developing the OPD equations in that OPD equation set. Where the operational sensor set contains a number of sensors known to be reliable, the number of sensor sets in matrix 40' may be reduced to eliminate the reliable sensors when creating matrix 40'. Further, if the total number of faulty sensors exceeds a predetermined number, or the expected performance of the system drops below a predetermined acceptable failure threshold, operational imaging device 50 would declare itself to be non-functional and issue a service request.

Figure 7:
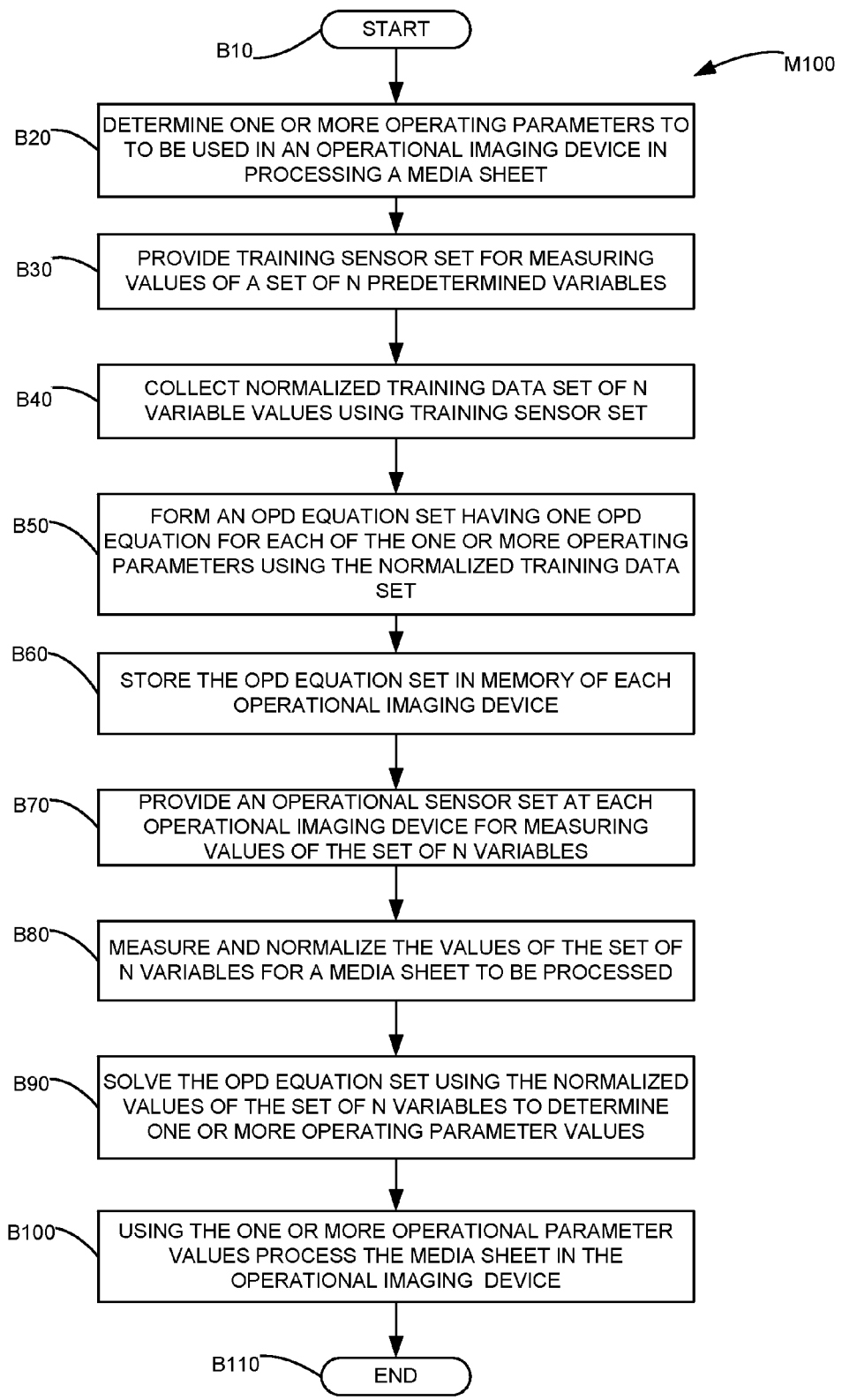
FIG. 7 is a simplified block diagram of the present method of determining operational parameter characteristic equation sets in an operational imaging device to determine one or more operating parameters.

FIG. 7 provides a simplified flow chart of the present method. For method M100, the actions of blocks B10-B50 would occur using the training system 10 while those of blocks B60-B100 would occur in each operational imaging device 50. Method M100 starts at block B10 and proceeds to block B20 where one or more operating parameters to be used by an operational imaging device for processing a sheet is determined. Next at block B30, a training sensor set for measuring values of a set of N predetermined variables is provided. At block B40, using the training sensor set, normalized training data set is collected. At block B50, an OPD equation set is formed using the normalized training data set to having one OPD equation for each of the one or more operating parameters. Thereafter at block B60, the OPD equation set 40 is stored in memory 53 of each operational imaging device 50. At block B70, an operational sensor set 52 for measuring the values of the set of N variables is provided for each operational imaging device 50. At block B80, the values of the set of N variables is measured for a media sheet about to be processed and the values normalized. At block B90, the OPD equation set is solved using the normalized values of the set of N variables to determine one or more operating parameter values. At block B100, the media sheet to be processed is processed by the operational imaging device using the one or more operational parameter values. At block B110, method M100 ends.

Figure 8A:
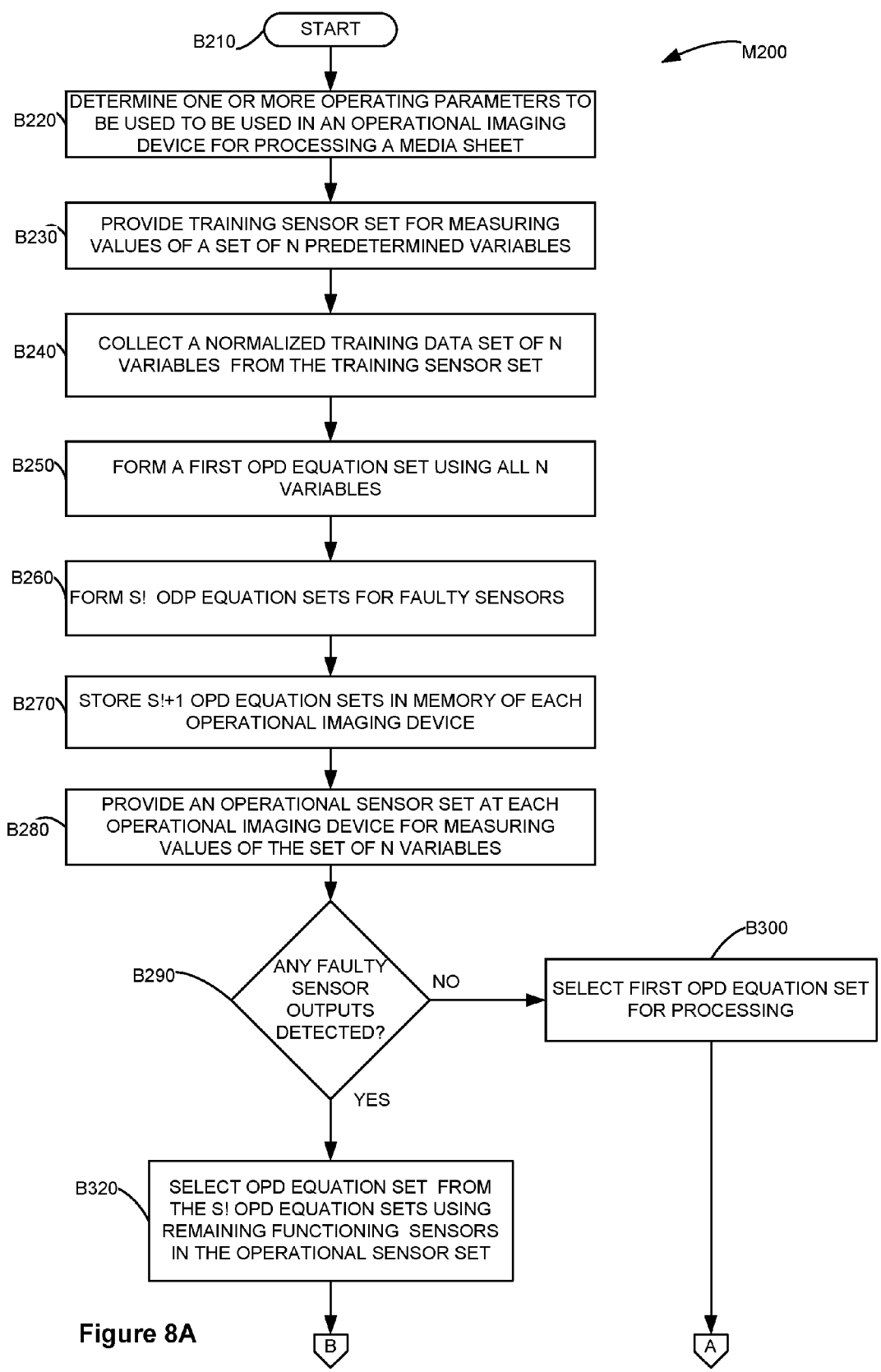
FIGS. 8A-8B are simplified block diagrams of the present method providing for operation in the event of a faulty sensor in an operational imaging device.
Figure 8B:
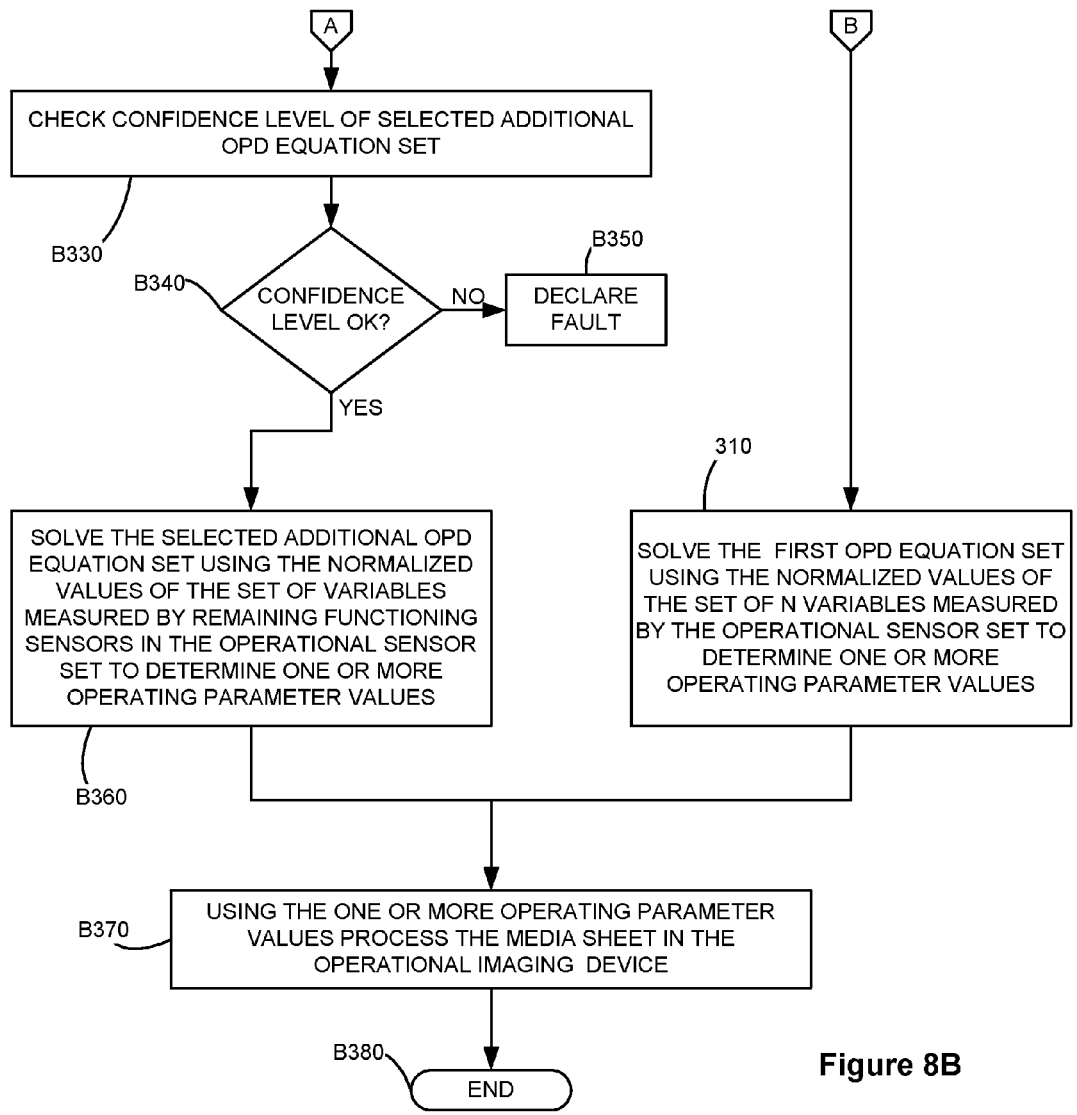

FIGS. 8A-8B provide a simplified flow chart of another form of the present method. For method M200, the actions of blocks B220-B260 would occur using the training system 10 while those of blocks B260-B370 would occur in each operational imaging device 50. Method M200 starts at block B210 and proceeds to block B220 where the one or more operating parameters to be used by an operational image device for processing a media sheet are determined. Next at block B230, a training sensor set for measuring values of a set of N predetermined variables is provided. At block B240, using the training sensor set, a normalized training data set is collected. At block B250, a first OPD equation set having one or more OPD equations is formed where all of the variables in the set of N variables are being measured by the training sensor set. The OPD equation set produced will be selected when all of the sensors in the operational imaging device are functioning properly. At block B260, a number of additional OPD equation sets are formed from the normalized training data set 26 that have been modified to remove data values associated with a faulty sensor. The number of modified additional OPD equation sets will be S! where S is the number of sensors in the training and operational sensor sets 14, 52. For example, if the impedance sensor was determined to be faulty, then the impedance magnitude and phase data values would not be used. If the impedance sensor and bending or stiffness sensor were both faulty, then the impedance magnitude and phase data and the stiffness data would not be used. This process will be repeated for all of the combinations of sensors in the training sensor set 14. As the number of faulty sensors increases it may still be possible to operate the operational imaging device 50. However, there will be a point at which the operational imaging device 50 will no longer be able to determine the one or more operational parameters. This may be taken into account as described with the operations given in blocks B290, and B320-B350.

At block B270, the S!+1 OPD equation sets, where the +1 represents the first OPD equation set having all sensors functioning, are stored in memory 53 of each operational imaging device 50. At block B280 an operational sensor set 52 for measuring the values of the set of N variables is provided for each operational imaging device 50. At block B290 a determination is made to see whether or not any faulty sensor outputs are detected. When it is determined that all of the sensors S in the operational sensor set 52 are functioning, at block B300, method 200 selects the first OPD equation set where all sensors are functioning. Thereafter, at block B310, method 200 solves the first OPD equation set using the measured values for the set of N variables to determine one or more operating parameter values. Method M200 then proceeds to block B370.

When it is determined that faulty sensor outputs are presented, the faulty sensors outputs are flagged by controller 51 which then proceeds to select, based on the combination of the remaining functioning sensors or on the combination of the malfunctioning sensors in the operational sensor set 52, the appropriate additional OPD equation set from the S! OPD equation sets that have been stored in memory 53. At block B330 the confidence level of the selected additional OPD equation set is checked. The confidence check determines that the appropriate OPD equations are present in firmware 53. When the confidence threshold is not met, i.e., an equation is missing, method M200 declares a fault at block 350 and may issue a service request. When it is determined that the confidence threshold has been met, method M200 proceeds to block B360, the selected additional OPD equation set is solved using the normalized values of the set of variables that are measured by the remaining functioning sensors in operational sensor set 52 to determine one or more operating parameter values.

At block B370, the media sheet to be processed is processed by the operational imaging device using the one or more operating parameters. At block B380, method M200 ends. After completion the process M200 may return to block B290 to recheck for faulty sensors prior to the processing of the next sheet of media. The operations of block B290 may also be performed periodically, such as, prior to beginning a new media processing job.

Example cases using the operational imaging devices 50 which are electrophotographic printers will now be described to illustrate the present method and the high degree of flexibility that may be used when developing and implementing the OPD equation set by use of different variables and sensor sets. In each of Tables 3-4 and 8-11, the term "A" is a linear offset term in the OPD equation. When the OPD equation set uses polynomial equation form, the number of terms is a function of the polynomial order and the number of variables, or roughly of the number of sensors in each of the sensor sets 52-1-52-K assuming each sensor is measuring a single variable. In the simplest case, the polynomial order is one, the decision surface is a constant, and thresholding is used. In the most complex case, the form of the equation is a polynomial and a higher order polynomial would be used. However as the equation order increases a concern of overfitting of the data may arise if the training data set 26 does not contain a sufficient number of values. For these reasons, the order of polynomial equations when used will generally have an order between first and fifth. The number of OPD equations in the OPD set 40 would be the number of operating parameters for which a value is desired. Some sensors may be used to make multiple measurements, e.g., impedance magnitude and phase.

The coefficients used for each OPD equation will be a function of the range normalization as well as the actual design of the hardware in the operational imaging device 50. Several things about the present system are universal. One of those is that certain sensor term combinations are more important than other in determining the value of the one or more operating parameter values. The number of terms kept in the OPD equation determines the resolution of the system, but each decreasingly important term makes less of a difference to the value of the operating parameter.

Table 2 presents the listing of the equation variables and their corresponding sensor values used for generating an OPD equation set. For Case 1, sensor set 52 comprises seven sensors—a temperature sensor, a relative humidity sensor, an impedance sensor, reflectance sensor, stiffness sensor, optical transmission sensor, and media feed system resistance sensor—to measure the nine listed variables. After conditioning and normalization, the measured variable values of the set of N variables are fed into each OPD equation.

TABLE 2

Case 1 Sensor Value Inputs For An OPD Equation Set

| Variable | Sensor Value |
|---|---|
| X1 | Temperature |
| X2 | Relative Humidity |
| X3 | Media Electrical Impedance Magnitude |
| X4 | Media Electrical Impedance Phase |
| X5 | Media Reflectance |
| X6 | Media Stiffness or Media Feed Motor Current |
| X7 | Media Optical Transmission Mean |
| X8 | Media Optical Transmission Deviation |
| X9 | Media Feed System Base Resistance |

With the exception of variable X9, these are the same sensor inputs that may be used for determining media type. Variable X9 represents an operational imaging device variable, in this case, a base resistance or friction measurement of the media feed system that occurs when the media feed system is operating without media being transported. The temperature and humidity sensors help identify when the media is or is not acclimated to its environment. With the present system, it is no longer necessary to know if a particular media sheet is plain paper, but rather it is important to know how that particular media sheet will react in the operational imaging device 50. The variable values measured by the sensor set provide knowledge related to a media type and a state that the imaging device is entering—and how that particular imaging device state will react to that media sheet.

Two aspects to designing a continuum system for determining operating parameter values are identification of media characteristics and curve fitting. The characteristics of the media to be identified relate to how the media will perform in the imaging device and providing a means for measuring these characteristics or a surrogate for these characteristics. For example a surrogate for stiffness may be media feed motor current in that as stiffness of the media increases, media feed motor current also increases. A curve fitting technique to be used is one which will allow for complex forms of these measured characteristics to be used to smoothly fit the output desired. The more degrees of freedom, the better any one curve can be fit. However, the better the sensors are at measuring the chosen characteristic and the better the selection of those chosen characteristic, the fewer terms will be needed in each operating parameter determining (OPD) equation to achieve acceptable results.

For the purposes of developing an OPD equation that can respond evenly to the different input values provided by the sensor set 52, the measured variable values are normalized or otherwise adjusted to a uniform mean and standard deviation range. This is because units of Ohms have no physical comparison to units of optical density or degrees of temperature, etc. The goal is to compare how the media is changing with respect to its physical properties and by normalizing the inputs to the same order of magnitude and variation range this can be easily mathematically achieved by the imaging device.

Simply using the measured variable values from the sensor set 52 is too confining of a mathematical structure and the desired output curve cannot be well fit with an equation of the form as shown in Equation 1. As illustrated, Equation 1 provides a transfer voltage value.

$$A+B(\text{sensor variable 1})+C(\text{sensor variable 2})+D(\text{sensor variable 3})\ldots=\text{Transfer Voltage} \quad \text{Eq. 1}$$

To make Equation 1 output more closely follow the desired system output, additional variable terms are added with coefficients to increase the degrees of freedom. One way to achieve this is to create higher order terms by creating combinations of the sensor terms listed in Table 4. The most significant terms will be those which represent real values that separate media properties and operational imaging device properties. Many of these variable terms are the same ones that are useful in determining a media type in a media classification system. The term "A" represents a linear offset term in the OPD equation. The most significant terms are presented in Table 3. Table 4 provides the coefficients for the terms.

TABLE 3

Most Significant Terms for Transfer Voltage OPD Equation

| Positive Terms | | Negative Terms | |
|---|---|---|---|
| A | X2*X4 | X7 | X3*X4*X9 |
| X3 | X4*X7*X8 | X2*X4*X8 | X5 |
| X2*X6*X7 | X1*X3^2 | X2*X4*X8 | X3*X5^2 |
| X9 | X5*X6*X7 | X2 | X9*X7 |
| $\sqrt{X9}$ | X5*X6*X7 | X7^2 | X1*X4 |
| X3^2 | X3^2*X6 | X2*X6^2 | X9*X4 |
| X1*X3 | X2*X5*X7 | X5^2*X7 | X5*X8 |
| X1*X7*X8 | X2*X8 | X3*X7*X8 | X3*X7^2 |
| X3*X5*X7 | X4*X6*X7 | X3*X4*X8 | X1 |
| X9*X3 | X3*X6 | X7*X8 | X2*X3^2 |
| X8 | X4*X6 | X6*X7^2 | X9^2 |
| X3^2*X5 | X1*X3 | X1^2*X6 | |
| X3^2*X7 | X6*X8 | X4*X8 | |
| X5*X7 | X3*X4*X6 | | |

TABLE 4

Coefficients and Sensor Input Combinations
For Transfer Voltage OPD Equation

| Coefficient | Variable | Coefficient | Variable |
|---|---|---|---|
| 3057.239 | A | 8.731913 | X3*X7 |
| −143.601 | X1 | −70.9145 | X3*X7*X8 |
| 89.26599 | X1*X3 | −131.039 | X3*X7^2 |
| 13.07313 | X1*X3 | 104.382 | x3^2 |
| −5.0232 | X1*X3*X6 | 75.58089 | X3^2*X5 |
| 42.44421 | X1*X3^2 | 24.81668 | X3^2*X6 |
| −114.241 | X1*X4 | 52.24638 | X3^2*X7 |
| 88.9048 | X1*X7*X8 | 1.070851 | X4 |
| 6.3538 | X1^2*X4 | 15.99507 | X4*X6 |
| −81.2889 | X1^2*X6 | 16.86189 | X4*X6*X7 |
| −37.4706 | X2 | 43.0811 | X4*X7*X8 |
| −217.454 | X2*X3^2 | −81.9473 | X4*X8 |
| 45.32479 | X2*X4 | −95.2629 | X5 |
| 10.82923 | X2*X4*X6 | 27.2136 | X5*X6*X7 |
| −20.3539 | X2*X4*X8 | 27.2136 | X5*X6*X7 |
| −20.3539 | X2*X4*X8 | 50.22174 | X5*X7 |
| 23.01471 | X2*X5*X7 | −124.333 | X5*X8 |
| 130.6781 | X2*X6*X7 | −65.3627 | X5^2*X7 |
| −59.9427 | X2*X6^2 | −10.7021 | X6 |
| 17.64499 | X2*X8 | −80.4981 | X6*X7^2 |
| 158.5478 | X3 | 13.01479 | X6*X8 |
| 11.55195 | X3*X4*X6 | −11.1818 | X7 |
| −2.56321 | X3*X4*X7 | −39.3812 | x7^2 |
| −74.4935 | X3*X4*X8 | −74.7471 | X7*X8 |
| −84.8457 | X3*X4*X9 | 78.64941 | X8 |
| −1.86669 | X3*X5 | 114.7954 | X9 |
| −2.66957 | X3*X5*X6 | −254.824 | x9^2 |
| 87.80242 | X3*X5*X7 | 111.6751 | X9 sqrt |
| −103.244 | X3*X5^2 | 79.7939 | X9*X3 |
| 16.16232 | X3*X6 | −118.987 | X9*X4 |
| −10.0377 | X3*X6*X8 | −109.159 | X9*X7 |

Using the terms listed in Table 4, the final equation in this case would be of the form set forth in Equation 2:

$$3057-143(X1)+89(X1 \cdot X3)+\ldots-109(X9 \cdot X7)$$
$$=\text{Transfer voltage} \qquad \text{Eq. 2}$$

where the values X1 through X9 are the normalized sensor inputs described above.

Adding additional terms to this system will continually increase the ability of the OPD equation to better fit the desired output. If the desired output is a fuser temperature, or process state rather than a transfer voltage, these same sensor groupings will be significant because they fundamentally define the media entering the system. The coefficients will be different in each OPD equation.

The same effective result can be derived by using a neural network structure to develop the OPD equation set 40. In this case the degrees of freedom mentioned above are accomplished by the design of the neural network hidden layers and the number of elements in these layers. The coefficients for these equations will be as much a function of this structure as it is a function of the inputs. That having been said, the effectiveness of the OPD equation is determined by selecting sensor inputs that define the system and so the same sensor inputs used for the polynomial form of Equation 2 are also recommended for the neural network equation. Reducing these sensor inputs will yield an increasingly less effective predictor while increasing them will give a better prediction but with diminishing return for the effort as the additional terms provide smaller and smaller contributions to the output. A neural network structure with both one and two hidden layers and with 30 members per hidden layer will provide effective OPD equations. Other variations on that structure will also work, with the tradeoff of complexity with more layers or members and less fit with fewer.

The characteristic equation resulting from a neural network structure is best shown as steps using matrix notation. The sigmoid function is an operation that creates a step response to an input by using an exponent. If "z" represents a value then the sigmoid of z would be as given in Equation 3.

$$\text{Sigmoid}(z)=1.0/(1.0+e^{\hat{}}(-z)) \qquad \text{Eq. 3}$$

The form of the OPD equation will bring in a matrix of coefficients with a column for each sensor input and a number of rows that would be determined by the number of "degrees of freedom" of the designer of the neural network. Let "theta" be the coefficient of values and X represent a vector of sensor inputs. This vector is then multiplied by the theta matrix and the resultant matrix has the sigmoid transformation done on each element. We label the resulting matrix "h" as shown in Equation 4.

$$h\{1\}=\text{sigmoid}([X]*\text{theta}\{1\}') \qquad \text{Eq. 4}$$

This new "h" matrix becomes the input for the next step. A linear offset term (a "1" is added, now as the first column) and the matrix is multiplied by the next matrix of coefficients and again it is transformed using the sigmoid function. This step will be repeated for as many hidden layers as was used by the initial neural network design as shown in the pseudo-code fragment below.

```
for(j=2: size(theta, 2)-1)
  h{j}=sigmoid([ones(m, 1) h{j-1}]*(theta{j})')
end
```

The sigmoid function produces a step response, and the output desired in the continuum is a variable that is not a classification, but a scaled output. In this case the column of "1" is added to the input matrix "h" and the result is multiplied by the theta coefficients. In matrix math this results in a sum that yields a single number output—in this case a transfer voltage of the form shown in Equation 5.

$$\text{Result}=[\text{ones}(m, 1)h\{\text{end}-1\}]*(\text{theta}\{\text{end}\})' \qquad \text{Eq. 5}$$

As stated earlier both a one hidden layer and a two hidden layer structure with around 30 units in each hidden layer produced an effective result. The example given below is for a single hidden layer with 30 units in that layer. The sensor inputs are as given above but are in the following order given in Table 5.

TABLE 5

Neural Network Generated OPD Equation

| Variable Value | Variable |
|---|---|
| X1 | Temperature |
| X2 | Relative Humidity |
| X3 | Impedance Magnitude |
| X4 | Impedance Phase |
| X5 | Gloss |
| X6 | Media Feed Motor Current or Bending Stiffness |
| X7 | Optical transmission Mean |
| X8 | Optical Transmission Deviation |
| X9 | Media Feed System Base Resistance |

Given the same sensor values listed above, normalized prior to being inserted into the OPD equation, an example theta(1) matrix would be as given in Table 6. In the theta(1) matrix there is one column for each sensor value and the number of rows used determines the number of degrees of freedom desired.

TABLE 6

Theta(1) Matrix

| X3 | X4 | X6 | X5 | X7 | X8 | X9 | X1 | X2 |
|---|---|---|---|---|---|---|---|---|
| 2.692023 | 2.64137 | 2.036872 | 2.529483 | −2.46621 | 2.909323 | −0.80997 | 1.593036 | −1.30291 |
| 1.229676 | 0.550117 | 2.081974 | −1.02674 | 0.435903 | −1.3962 | −2.0835 | 3.313123 | 0.40123 |
| 0.164017 | −2.39828 | −1.55784 | −1.24632 | −1.01061 | −0.94107 | 1.401627 | 3.255569 | 2.035072 |
| 2.281025 | −2.37671 | −1.48857 | −1.25579 | −2.23681 | −2.04623 | −0.53611 | −2.09916 | −1.0921 |
| 2.742936 | 1.966169 | 0.018746 | −0.16954 | −1.19995 | −2.11986 | 0.013669 | −1.05072 | 0.991481 |
| 2.931461 | 0.038017 | 0.940001 | 0.494759 | 2.217553 | −2.52445 | 1.791836 | −0.66338 | 1.723584 |
| −3.59182 | 1.898287 | −0.28059 | −2.85234 | 0.357394 | 0.015829 | −1.03632 | 1.567356 | −1.11323 |
| 2.728307 | −0.78949 | −1.65537 | 1.681478 | −0.21748 | 1.989543 | −2.58322 | −0.06827 | 0.994866 |
| 0.188311 | 0.599968 | 2.780639 | 0.03762 | 2.600778 | 1.000057 | −0.05843 | 1.304811 | −2.0063 |
| 3.016298 | 1.083711 | −2.42819 | 2.122372 | −2.68013 | −2.19463 | 0.037464 | −0.59215 | 2.364666 |
| 0.094958 | −2.76293 | −2.27546 | −0.88049 | 1.336833 | −2.50858 | 2.407907 | −1.89978 | −1.79552 |
| −0.24875 | 0.660392 | −2.06371 | −0.48376 | 1.441605 | 1.732733 | 1.47686 | −2.46582 | −1.55143 |
| 1.829367 | −0.76403 | −1.95199 | −2.6316 | 0.343407 | 2.498037 | 1.354273 | 1.471894 | 1.872394 |
| −2.48447 | −2.68668 | 1.080404 | −1.24565 | −1.70385 | 0.446724 | −2.23546 | −2.02045 | −0.14524 |
| −0.34284 | −0.15692 | 0.493637 | 0.840528 | 0.273104 | −2.38474 | −2.17658 | −1.10765 | 2.075476 |
| 2.811951 | −1.0222 | −2.92364 | 0.226217 | −1.18378 | 1.60814 | −1.51033 | 1.836322 | −0.81828 |
| 0.087447 | −2.46863 | 2.334339 | 1.575278 | −2.31102 | −1.36479 | 1.719441 | −1.87129 | −1.10247 |
| 1.978675 | −1.9005 | 1.258006 | −1.90755 | −1.68464 | −1.39899 | 2.630976 | 1.085276 | −2.95781 |
| 1.352383 | −2.05488 | 1.532632 | 2.939421 | 2.076641 | 1.702483 | 1.061289 | −0.1585 | 0.886554 |
| 0.049147 | −1.90069 | −2.53631 | 0.375168 | −2.69858 | −2.48826 | −2.31615 | −2.1365 | −0.4058 |
| −1.52663 | −2.7119 | 2.595166 | 0.555181 | −2.09901 | −2.19825 | 1.242909 | 1.627755 | −0.20551 |
| 1.157534 | 0.004056 | 2.458623 | 2.962207 | −2.73963 | 0.332801 | −1.82669 | −2.39293 | 1.366868 |
| −2.6015 | −1.0856 | 2.628242 | −0.7388 | −0.35176 | 1.054609 | −2.55007 | −0.94467 | −2.83657 |
| 0.577273 | 0.353141 | 2.192155 | −0.14751 | −2.92345 | 0.201639 | 1.036219 | −1.58837 | −1.01841 |
| 1.146468 | 1.325541 | 1.9324 | −0.29642 | 1.991052 | 1.33362 | −1.45204 | 0.416969 | 1.562413 |
| 1.053539 | −0.07788 | 0.47709 | 1.691123 | −1.72648 | 1.228535 | 0.022503 | −2.4468 | 0.772639 |
| 2.74392 | 0.342872 | −1.98895 | 1.641255 | −2.29 | 1.663908 | 1.361972 | −0.60377 | −2.03803 |
| 2.872839 | −0.77723 | −1.61922 | −2.57093 | −0.30991 | 1.21386 | 0.417967 | −2.38497 | −1.57702 |
| 1.964806 | −2.24797 | −2.17532 | −1.75986 | −0.49731 | 0.709518 | 1.584963 | −2.18941 | −2.06942 |
| −0.30406 | −0.39855 | −2.64051 | −2.15397 | −2.84684 | 0.373746 | −1.44715 | 1.117081 | −2.40829 |

Each sensor value is multiplied by 30 different numbers to allow for it to combine in the next step with every other sensor value, effectively creating the same complicated interaction terms that were developed in the polynomial form of the OPD equation shown in Equation 2. Because of the complexity of a neural network, it is not as easy to identify more significant terms, and all are left in. The column of 1's is added to allow for a linear offset. Also, unlike Equation 2, at this point the result is transformed by the sigmoid function into more of a binary signal.

Theta (2) is now a row vector, 31 units long because of the column of 1's added to the result of the previous step. Shown as a column theta 2 is set forth in Table 7.

TABLE 7

Theta 2 using a hidden layer of thirty units 0.319874
0.183866
1.008263
0.686482
−0.99532
1.139101
−0.30202
−1.07943
−1.02322
−0.11549
−0.14995
−0.43574
−0.32077
0.22596
−1.2211
−0.85895
1.773512
0.08879
0.487059
−0.02573

TABLE 7-continued

Theta 2 using a hidden layer of thirty units

−0.20624
−0.81774
0.689407
0.765812
−0.55163
−1.38271
−0.28899

TABLE 7-continued

Theta 2 using a hidden layer of thirty units

−0.0957
2.063932
−1.39885
−0.58881

The product of this row vector and the matrix h being multiplied by it is summed to a single value. In this case to change this last result into actual values, the answer is then "un-normalized" using the mean and standard deviation which was used when the neural network was being trained. It is not necessary to normalize this output and then "un-normalize" it, however, if that is not done, then the coefficients of this last matrix would be correspondingly larger values. In this case the answer can be "de-normalized" using the values of a mean of 3054 and a standard deviation of 850. Note that the mean is very close to the offset term from Equation 2, because Equation 2 puts the line centered on the mean and then uses the other terms to rotate and fit the curve.

Both of these methods produce a complex equation which allows for degrees of freedom between the measured variable values provided by sensor set 52 in order to fit a continuous response. The complexity in both cases is the tradeoff for goodness of fit, and each relies on interactions of the different normalized sensor inputs to deliver the desired complexity. The key is getting the right sensor inputs to predict critical parameters. That set will include those needed for media identification and "state" as well as those needed to understand the input printer "state".

Provided in Table 8 below are the variables and their coefficients for an OPD equation that provides a value for the fuser temperature. This OPD equation is in the form of a second order polynomial equation.

TABLE 8

Fuser Temperature OPD Equation Terms

| | |
|---|---|
| 177.659 | A |
| 4.360493 | $X8^2$ |
| 2.779962 | $X3 * X6$ |
| 2.702479 | $X7$ |
| −2.64338 | $X5^2$ |
| 2.437474 | $X7 * X1$ |
| 2.381767 | $X3 * X7$ |
| 2.161363 | $X6 * X7$ |
| −2.14363 | $X4 * X7$ |
| 2.043665 | $X3 * X5$ |
| −1.96926 | $X8 * X1$ |
| −1.83581 | $X7 * X8$ |
| −1.78452 | $X3 * X8$ |
| 1.738869 | $X9 * X2$ |
| −1.51045 | $X9 * X1$ |
| −1.34671 | $X8$ |
| 1.323059 | $X5 * X9$ |
| −1.31135 | $X4 * X5$ |
| −1.30392 | $X5 * X8$ |
| 1.279344 | $X6 * X1$ |
| 1.259974 | $X6 * X2$ |
| 1.214812 | $X4 * X8$ |
| −1.16663 | $X3^2$ |
| 1.065318 | $X7 * X9$ |
| 0.998232 | $X5$ |
| −0.98715 | $X9^{0.5}$ |
| −0.98075 | $X5 * X2$ |
| 0.928255 | $X1^2$ |
| −0.90261 | $X6^2$ |
| −0.87796 | $X4^2$ |
| 0.877259 | $X3$ |
| −0.85924 | $X4 * X6$ |
| 0.807327 | $X6$ |

TABLE 8-continued

Fuser Temperature OPD Equation Terms

| | |
|---|---|
| −0.78489 | $X6 * X8$ |
| −0.72079 | $X4 * X2$ |
| −0.69697 | $X7^2$ |
| 0.666524 | $X2$ |
| −0.58557 | $X3 * X2$ |
| 0.585111 | $X8 * X9$ |
| −0.49376 | $X2^2$ |
| 0.449973 | $X3 * X1$ |
| 0.435448 | $X6 * X9$ |
| 0.42654 | $X5 * X1$ |
| 0.422384 | $X3 * X4$ |
| −0.33089 | $X7 * X2$ |
| 0.301618 | $X1 * X2$ |
| −0.13264 | $X6 * X5$ |
| −0.12722 | $X3 * X9$ |
| 0.117252 | $X4 * X9$ |
| 0.105334 | $X4$ |
| −0.09623 | $X9$ |
| −0.05214 | $X9^2$ |
| −0.04472 | $X1$ |
| −0.04182 | $X5 * X7$ |
| 0.032238 | $X4 * X1$ |
| 0.001743 | $X8 * X2$ |

Table 9 sets out the most significant terms for the fuser temperature OPD equation set forth in Table 8. These terms were chosen because the values of their coefficients are such that these terms provide greater input into determining the fuser temperature value than those terms not chosen.

TABLE 9

Fuser Temperature OPD Equation Most Significant Terms

| | | | |
|---|---|---|---|
| 177.659 | A | −1.78452 | $X3*X8$ |
| 4.360493 | $X8^2$ | 1.738869 | $X9*X2$ |
| 2.779962 | $X3*X6$ | −1.51045 | $X9*X1$ |
| 2.702479 | $X7$ | −1.34671 | $X8$ |
| −2.64338 | $X5^2$ | 1.323059 | $X5*X9$ |
| 2.437474 | $X7*X1$ | −1.31135 | $X4*X5$ |
| 2.381767 | $X3*X7$ | −1.30392 | $X5*X8$ |
| 2.161363 | $X6*X7$ | 1.279344 | $X6*X1$ |
| −2.14363 | $X4*X7$ | 1.259974 | $X6*X2$ |
| 2.043665 | $X3*X5$ | 1.214812 | $X4*X8$ |
| −1.96926 | $X8*X1$ | −1.16663 | $X3^2$ |
| −1.83581 | $X7*X8$ | 1.065318 | $X7*X9$ |

Using only the most significant terms also for the use of a truncated equation which may be beneficial should memory space or processor processing capacity be a concern.

Provided in Table 10 below are the variables and their coefficients for an OPD equation that provides a value for the fuser energy which is a function of temperature and time. These OPD equation terms are in the form of a second order polynomial equation.

TABLE 10

Fuser Energy OPD Equation Terms

| | |
|---|---|
| 53.57412 | A |
| 4.901913 | $X7^2$ |
| 4.38977 | $X8^2$ |
| −3.77261 | $X7 * X8$ |
| 3.240785 | $X3 * X5$ |
| −3.07477 | $X5 * X7$ |
| 2.797365 | $X3^2$ |
| −2.2729 | $X3 * X4$ |
| 2.259006 | $X3$ |
| 2.09444 | $X3 * X7$ |
| −1.92155 | $X5 * X8$ |
| −1.53575 | $X4 * X5$ |

TABLE 10-continued

Fuser Energy OPD Equation Terms

| | |
|---|---|
| 1.472604 | X5 |
| 1.420837 | X5^2 |
| −1.31111 | X6^2 |
| 1.045198 | X5 * X1 |
| −0.95244 | X4 * X7 |
| 0.925243 | X8 * X2 |
| 0.828831 | X7 |
| −0.81997 | X3 * X8 |
| −0.76214 | X6 * X1 |
| 0.741467 | X7 * X2 |
| −0.73616 | X9 * X2 |
| 0.662914 | X5 * X9 |
| 0.568692 | X5 * X2 |
| 0.546279 | X4 * X1 |
| 0.531602 | X2^2 |
| −0.50366 | X1 |
| 0.498057 | X7 * X1 |
| −0.47917 | X1^2 |
| −0.47739 | X6 |
| −0.44323 | X6 * X9 |
| 0.427006 | X8 * X1 |
| −0.41085 | X6 * X2 |
| 0.40138 | X4 * X6 |
| −0.38928 | X8 * X9 |
| −0.3593 | X6 * X7 |
| 0.356851 | X3 * X9 |
| 0.35179 | X8 |
| 0.348183 | X6 * X5 |
| 0.3342 | X3 * X6 |
| 0.302616 | X3 * X1 |
| 0.280159 | X7 * X9 |
| 0.19619 | X9^2 |
| −0.17726 | X9 * X1 |
| 0.15888 | X4 |
| −0.15362 | X3 * X2 |
| 0.144719 | X1 * X2 |
| −0.14144 | X4 * X8 |
| 0.099449 | X4 * X2 |
| 0.055014 | X6 * X8 |
| −0.03157 | X2 |
| −0.02062 | X9 |
| −0.01611 | X4 * X9 |
| −0.00945 | X4^2 |
| 0.002034 | X9^0.5 |

In Table 11 the most significant terms for the fuser temperature OPD equation set forth in Table 10 is provided. These terms were chosen because the values of their coefficients are such that these terms provide greater input into determining the fuser temperature value. Again, using only the most significant terms also for the use of a truncated equation which may be beneficial should memory space or processor processing capacity be a concern.

TABLE 11

Fuser Energy OPD Equation Most Significant Terms

| | | | |
|---|---|---|---|
| 53.57412 | A | 2.259006 | X3 |
| 4.901913 | X7^2 | 2.09444 | X3*X7 |
| 4.38977 | X8^2 | −1.92155 | X5*X8 |
| −3.77261 | X7*X8 | −1.53575 | X4*X5 |
| 3.240785 | X3*X5 | 1.472604 | X5 |
| −3.07477 | X5*X7 | 1.420837 | X5^2 |
| 2.797365 | X3^2 | −1.31111 | X6^2 |
| −2.2729 | X3*X4 | 1.045198 | X5*X1 |

Again, the OPD equations given in Tables 8-11 may be written in a matrix form as previously described.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. In an imaging device, a method of determining one or more operating parameters for processing a media sheet by a processing device in the imaging device, the method comprising:
storing in memory of the imaging device a predetermined set of OPD equations incorporating a predetermined set of N variables related to the media sheet and the processing thereof by the processing device of the imaging device wherein each OPD equation corresponds to one operating parameter of the one or more operating parameters;
providing an operational sensor set having a plurality of sensors for the imaging device for measuring a value of each variable in the set of N variables, the operational sensor set in operative communication with a controller for providing corresponding output signals representative of the measured values for the set of N variables;
converting the received output signals into the N measured variable values;
solving the set of OPD equations using the received N measured variable values to determine the one or more operating parameters; and,
processing the media sheet with the processing device using the determined one or more operating parameters,
wherein each equation in the predetermined set of OPD equations is a polynomial equation.

2. In an operational imaging device having an operational sensor set for measuring values of a predetermined set of N variables related to a media sheet and the processing thereof by a processing device of the operational imaging device, a method of determining one or more operating parameters for processing the media sheet by the processing device in the imaging device, the method comprising:
storing in memory of the imaging device a predetermined set of OPD equations incorporating the predetermined set of N variables related to the media sheet and the processing thereof by the processing device of the imaging device wherein each OPD equation corresponds to one operating parameter of the one or more operating parameters;
measuring, using the operational sensor set, a value of each variable in the set of N variables, the operational sensor set providing corresponding output signals representative of the measured values for the set of N variables, the operational sensor set being in operative communication with a controller; and
at the controller:
converting the output signals received from the operational sensor set into measured normalized variable values for the set of N variables;
solving the OPD equation set using the measured normalized variable values to determine one operating parameter for each OPD equation in the OPD equation set; and,
processing the media sheet with the processing device using the operating parameters determined from the solving of the OPD equation set,
wherein each equation in the OPD equation set is a polynomial equation.

3. The method of claim 2, wherein the operational sensor set includes one or more sensors for making a direct sensor measurement of a characteristic of the media sheet.

4. The method of claim 2, wherein the operational sensor set includes one or more sensors for measuring a temperature, a relative humidity and a machine state.

5. The method of claim 2, wherein the operational sensor set includes one or more sensors for making a subsystem response measurement.

6. The method of claim 2, wherein each equation of the OPD equation set is truncated so that the remaining terms in each equation of the OPD equation set have coefficients of a larger absolute value when compared to the coefficients of the terms truncated therefrom.

7. The method of claim 2, wherein the OPD equation set stored in memory is generated by:
    determining the one or more operating parameters to be used by an operational imaging device in processing the media sheet;
    determining the number of variables in the set of N variables needed to determine the one or more operating parameters;
    providing a training sensor set for measuring the set of N variables and providing corresponding output signals therefor;
    providing fuser temperature, fuser energy and transfer voltage data for reproducing a best match to a predetermined model image on a predetermined media type;
    using the training sensor set to measure the set of N variables with a known sample of each media type in a media set and a training imaging device and providing fuser temperature, fuser energy and transfer voltage best match data to create a corresponding training data set for the operational imaging device;
    inputting the training data set into a continuum training engine; and
    generating, using the continuum training engine and training data set, the OPD equation for each operating parameter in the one or more operating parameters forming the OPD equation set.

8. The method of claim 7, wherein the continuum training engine is one of a neural network, a nonlinear regression engine, and a Bayesian network.

9. A method of operating parameter determination for use in processing a media sheet in an operational imaging device, the method comprising:
    establishing one or more operating parameters to be used in the operational imaging device;
    determining a number of variables N needed to determine each of the one or more operating parameters;
    providing a training sensor set for measuring each of the N variables and providing corresponding output signal therefor;
    providing a media set having a plurality of media types;
    using the training sensor set to measure the N variables with a known sample of each media type in the media set and a training imaging device to create a training data set, wherein the measuring includes taking multiple measurements of each of the N variables;
    inputting the training data set into a continuum training engine;
    generating, using the continuum training engine and training data set, an operating parameter determining (OPD) equation for each of the one or more operating parameters incorporating corresponding N variable terms to create an OPD equation set for use with an operational set of sensors corresponding to the training sensor set; and
    in the operational imaging device:
        storing in memory the OPD equation set;
        providing the operational sensor set in operable communication with the operational imaging device, the operational sensor set measuring a value of each variable in the set of N variables and providing corresponding output signals for the measured N variables for the sheet of media to be processed;
        converting the received output signals into N measured normalized variable values;
        solving the each equation in the OPD equation set using the N measured normalized variable values to determine a corresponding one or more operating parameter values;
        using the determined one or more operating parameter values to process the media sheet in the operational imaging device.

10. The method of claim 9, wherein the measuring of multiple measurements of each of the N variables by the training sensor set occurs at a plurality of predetermined temperature and relative humidity combinations.

11. The method of claim 9, wherein the processing device is an electrophotographic printer and the set of N variables comprises temperature, relative humidity, electrical impedance magnitude, electrical impedance phase, gloss, bending stiffness, optical transmission mean, and optical transmission deviation, and, further wherein, the operational sensor set includes sensors for measuring the set of N variables.

12. The method of claim 11, wherein the set of N variables further includes a media feed base resistance, and, further wherein the operational sensor set includes a sensor for measuring the media feed base resistance.

13. The method of claim 12, wherein the OPD equation set includes an OPD equation for determining a fuser temperature value.

14. The method of claim 12, wherein the OPD equation set includes an OPD equation for determining a fuser energy value.

15. The method of claim 11, wherein the OPD equation set includes an OPD equation for determining a transfer voltage value.

16. The method of claim 15, wherein the set of N variables further includes a media feed base resistance, and, further wherein the operational sensor set includes a sensor for measuring the media feed base resistance.

17. The method of claim 16, wherein the OPD equation set includes an OPD equation for determining for determining a fuser temperature value, and an OPD equation for determining a fuser energy.

18. The method of claim 9, wherein each equation of the OPD equation set is truncated so that the remaining terms in each equation of the OPD equation set have coefficients of a larger absolute value when compared to the coefficients of the terms truncated therefrom.

19. In an operational imaging device configured for processing a media set consisting of a plurality of media types and an operational sensor set having S number of sensors for measuring a value for each variable in a set of N variables related to a media sheet and the processing thereof by a processing device of the operational imaging device, a controller in operative communication with the operational sensor set and receiving the corresponding output signals representative of the measured values for the set of N variables, a method of determining one or more operating parameters for processing the media sheet by the processing device in the operational imaging device, the method comprising:

storing in memory of the imaging device a predetermined matrix consisting of a first OPD equation set having one or more OPD equations and S! additional sets of OPD equation sets, wherein the first OPD equation set in the matrix has one or more OPD equations using measured values for all variables in the set of N variables measured by the S number of sensors, and the S! additional OPD determining equation sets each comprise one or more OPD equations where one or more variables in the set of N variables is missing; and determining whether or not all S number of sensors in the operational sensor set are functioning, and, when it is determined that all S number of sensors are functioning:
converting the received output signals into N measured normalized variable values;
solving the first OPD equation set using the received N measured normalized variable values to determine an operating parameter value for each of the one or more OPD equations therein.

20. The method of claim 19, wherein, when it is determined that one or more of the S number of sensors are non-functioning:
selecting from the S! additional OPD equation sets, a corresponding OPD equation set having one or more OPD equations that use variable values from the remaining functioning sensors in the operational sensor set;
converting the received output signals from the remaining functioning sensors into the measured normalized variable values;
solving the selected additional OPD equation set using the measured normalized variable values to determine to determine an operating parameter value for each of the one or more OPD equations therein; and,
processing the media sheet with the processing device using the determined one or more operating parameter values.

21. An imaging device comprising:
a controller;
a fuser;
an image transfer station;
an input area having a media set consisting of M types of media;
an output area for receiving a processed media sheet;
a media feed system for conveying a media sheet to be processed from the input area past the image transfer station and the fuser to the output area;
an operational sensor set for measuring values of a predetermined set of N variables related to the media sheet to be processed and the processing thereof and providing corresponding output signals representative of the measured set of N variables;
a memory containing a predetermined OPD equation set having one or more OPD equations incorporating the predetermined set of N variables wherein each of the one or more OPD equations when solved provides a corresponding operating parameter value; and
the fuser, the image transfer station, the media feed system, the operational sensor set and the memory in operative communication with the controller with the controller being configured to:
receive the output signals of the operational sensor set and convert the received output signals into corresponding normalized values for each variable in the set of N variables;
solve the OPD equation set using the received values for the set of N variables to determine the one or more corresponding operating parameter values; and
process the media sheet to be processed using the one or more determined operating parameter values and the image transfer unit, fuser, and media feed system,
wherein each of the one or more OPD equations is a polynomial equation.

22. The imaging device of claim 21 wherein the one or more determined operating parameter values is one of a transfer voltage value, a fuser temperature value, and a fuser energy value.

23. In an imaging device, a method of determining one or more operating parameters for processing a media sheet by a processing device in the imaging device, the method comprising:
storing in memory of the imaging device a predetermined set of OPD equations incorporating a predetermined set of N variables related to the media sheet and the processing thereof by the processing device of the imaging device wherein each OPD equation corresponds to one operating parameter of the one or more operating parameters;
providing an operational sensor set having a plurality of sensors for the imaging device for measuring a value of each variable in the set of N variables, the operational sensor set in operative communication with a controller for providing corresponding output signals representative of the measured values for the set of N variables;
converting the received output signals into the N measured variable values;
solving the set of OPD equations using the received N measured variable values to determine the one or more operating parameters; and,
processing the media sheet with the processing device using the determined one or more operating parameters,
wherein each equation in the set of OPD equations is a theta matrix.

24. In an operational imaging device having an operational sensor set for measuring values of a predetermined set of N variables related to a media sheet and the processing thereof by a processing device of the operational imaging device, a method of determining one or more operating parameters for processing the media sheet by the processing device in the imaging device, the method comprising:
storing in memory of the imaging device a predetermined set of OPD equations incorporating the predetermined set of N variables related to the media sheet and the processing thereof by the processing device of the imaging device wherein each OPD equation corresponds to one operating parameter of the one or more operating parameters;
measuring, using the operational sensor set, a value of each variable in the set of N variables, the operational sensor set providing corresponding output signals representative of the measured values for the set of N variables, the operational sensor set being in operative communication with a controller; and
at the controller:
converting the output signals received from the operational sensor set into measured normalized variable values for the set of N variables;
solving the OPD equation set using the measured normalized variable values to determine one operating parameter for each OPD equation in the OPD equation set; and,
processing the media sheet with the processing device using the operating parameters determined from the solving of the OPD equation set,
wherein each OPD equation is a theta matrix.

25. The method of claim 24, wherein the operational sensor set includes one or more sensors for making a direct sensor measurement of a characteristic of the media sheet.

26. The method of claim 24, wherein the operational sensor set includes one or more sensors for measuring a temperature, a relative humidity and a machine state.

27. The method of claim 24, wherein the operational sensor set includes one or more sensors for making an imaging subsystem response measurement.

28. The method of claim 24, wherein each equation of the OPD equation set is truncated so that the remaining terms in each equation of the OPD equation set have coefficients of a larger absolute value when compared to the coefficients of the terms truncated therefrom.

29. The method of claim 24, wherein the OPD equation set stored in memory is generated by:
  determining the one or more operating parameters to be used by an operational imaging device in processing the media sheet;
  determining the number of variables in the set of N variables needed to determine the one or more operating parameters;
  providing a training sensor set for measuring the set of N variables and providing corresponding output signals therefor;
  providing fuser temperature, fuser energy and transfer voltage data for reproducing a best match to a predetermined model image on a predetermined media type;
  using the training sensor set to measure the set of N variables with a known sample of each media type in a media set and a training imaging device and providing fuser temperature, fuser energy and transfer voltage best match data to create a corresponding training data set for the operational imaging device;
  inputting the training data set into a continuum training engine; and
  generating, using the continuum training engine and training data set, the OPD equation for each operating parameter in the one or more operating parameters forming the OPD equation set.

30. The method of claim 24, wherein the continuum training engine is one of a neural network, a nonlinear regression engine, and a Bayesian network.

31. In an operational imaging device having an operational sensor set for measuring values of a predetermined set of N variables related to a media sheet and the processing thereof by a processing device of the operational imaging device, a method of determining one or more operating parameters for processing the media sheet by the processing device in the imaging device, the method comprising:
  storing in memory of the imaging device a predetermined set of OPD equations incorporating the predetermined set of N variables related to the media sheet and the processing thereof by the processing device of the imaging device wherein each OPD equation corresponds to one operating parameter of the one or more operating parameters;
  measuring, using the operational sensor set, a value of each variable in the set of N variables, the operational sensor set providing corresponding output signals representative of the measured values for the set of N variables, the operational sensor set being in operative communication with a controller; and
  at the controller:
    converting the output signals received from the operational sensor set into measured normalized variable values for the set of N variables;
    solving the OPD equation set using the measured normalized variable values to determine one operating parameter for each OPD equation in the OPD equation set; and,
    processing the media sheet with the processing device using the operating parameters determined from the solving of the OPD equation set,
  wherein the processing device is an electrophotographic printer and the set of N variables comprises temperature, relative humidity, electrical impedance magnitude, electrical impedance phase, gloss, bending stiffness, optical transmission mean, and optical transmission deviation, and, further wherein, the operational sensor set includes sensors for measuring the set of N variables.

32. The method of claim 31, wherein the set of N variables further includes a media feed base resistance, and, further wherein the operational sensor set includes a sensor for measuring the media feed base resistance.

33. The method of claim 32, wherein the OPD equation set includes an OPD equation for determining a fuser temperature value.

34. The method of claim 32, wherein the OPD equation set includes an OPD equation for determining a fuser energy value.

35. The method of claim claim 31, wherein the OPD equation set includes an OPD equation for determining a transfer voltage value.

36. The method of claim 35, wherein the set of N variables further includes a media feed base resistance, and, further wherein the operational sensor set includes a sensor for measuring the media feed base resistance.

37. The method of claim 36, wherein the OPD equation set includes an OPD equation for determining for determining a fuser temperature value, and an OPD equation for determining a fuser energy.

38. An imaging device comprising:
  a controller;
  a fuser;
  an image transfer station;
  an input area having a media set consisting of M types of media;
  an output area for receiving a processed media sheet;
  a media feed system for conveying a media sheet to be processed from the input area past the image transfer station and the fuser to the output area;
  an operational sensor set for measuring values of a predetermined set of N variables related to the media sheet to be processed and the processing thereof and providing corresponding output signals representative of the measured set of N variables;
  a memory containing a predetermined OPD equation set having one or more OPD equations incorporating the predetermined set of N variables wherein each of the one or more OPD equations when solved provides a corresponding operating parameter value; and
  the fuser, the image transfer station, the media feed system, the operational sensor set and the memory in operative communication with the controller with the controller being configured to:
    receive the output signals of the operational sensor set and convert the received output signals into corresponding normalized values for each variable in the set of N variables;
    solve the OPD equation set using the received values for the set of N variables to determine the one or more corresponding operating parameter values; and process the media sheet to be processed using the one or more determined operating parameter values and the image transfer unit, fuser, and media feed system,
wherein each of the one or more OPD equations is a theta matrix.

39. The imaging device of claim 38 wherein the one or more determined operating parameter values is one of a transfer voltage value, a fuser temperature value, and a fuser energy value.

* * * * *